(12) United States Patent
Shah et al.

(10) Patent No.: US 12,141,824 B2
(45) Date of Patent: Nov. 12, 2024

(54) METHODS, APPARATUS, AND ARTICLES OF MANUFACTURE TO DETERMINE UNIQUE AUDIENCE SIZE VIA CLUSTERED DATA

(71) Applicant: The Nielsen Company (US), LLC, New York, NY (US)

(72) Inventors: Dipti Umesh Shah, Pleasanton, CA (US); Michael R. Sheppard, Holland, MI (US); Jing Liu, New York, NY (US); Olabode O. Oyeneye, Kew Gardens, NY (US); Edward Murphy, Uncasville, CT (US); Jonathan Sullivan, Hurricane, UT (US); Matthew Zipoy, Janesville, WI (US)

(73) Assignee: The Nielsen Company (US), LLC, New York, NY (US)

( * ) Notice: Subject to any disclaimer, the term of this patent is extended or adjusted under 35 U.S.C. 154(b) by 0 days.

(21) Appl. No.: 17/876,068

(22) Filed: Jul. 28, 2022

(65) Prior Publication Data
US 2023/0052274 A1 Feb. 16, 2023

Related U.S. Application Data

(60) Provisional application No. 63/229,007, filed on Aug. 3, 2021.

(51) Int. Cl.
G06Q 30/0201 (2023.01)
H04N 21/25 (2011.01)
H04N 21/258 (2011.01)

(52) U.S. Cl.
CPC ....... *G06Q 30/0201* (2013.01); *H04N 21/252* (2013.01); *H04N 21/25883* (2013.01)

(58) Field of Classification Search
CPC .......... G06Q 30/0242; G06Q 30/0254; H04N 21/44226; H04N 21/25866; H04N 21/6582
See application file for complete search history.

(56) References Cited

U.S. PATENT DOCUMENTS

| 10,469,903 | B2 | 11/2019 | Singh et al. | |
| 2017/0004526 | A1* | 1/2017 | Morovati | ........... G06Q 30/0242 |
| 2021/0049618 | A1 | 2/2021 | Sheppard et al. | |

* cited by examiner

*Primary Examiner* — Kyung H Shin

(57) ABSTRACT

Methods, apparatus, systems, and articles of manufacture are disclosed to determine unique audience size via clustered data. An example apparatus includes memory, machine readable instructions, and processor circuitry to at least one of execute or instantiate the machine readable instructions. The example processor circuitry is to form a first matrix identifying matching and non-matching instances of first values of respective demographics of an audience of media and second values of the respective demographics. Also, the processor circuitry is to normalize the first matrix to generate an account sharing adjustment matrix. Additionally, the processor circuitry is to apply the account sharing adjustment matrix to a vector of one or more counts of impressions of the media to correct for one or more members of the audience that share a user account registered with a database proprietor, the one or more counts of the impressions corresponding to the respective demographics.

21 Claims, 12 Drawing Sheets

| INVENTORY TYPE | ATTRIBUTE_COMBO_ID | COLLAPSED_GENRE_ID | COLLAPSED_GENRE | COLLAPSED_DAYPART_ID | COLLAPSED_DEVICE_ID |
|---|---|---|---|---|---|
| YOUTUBE | ARTS_ENTxALLxALL | 115 | ARTS_ENT | ALL | ALL |
| YOUTUBE | AUTOxALLxALL | 114 | AUTO | ALL | ALL |
| YOUTUBE | BTY & FITxALLxALL | 100 | BTY & FITS | ALL | ALL |
| YOUTUBE | FOOD_TRAVxALLxALL | 102 | FOOD_TRAV | ALL | ALL |
| YOUTUBE | GAMESxALLxALL | 103 | GAMES | ALL | ALL |
| YOUTUBE | H&GxALLxALL | 112 | H & G | ALL | ALL |
| YOUTUBE | HOB & LEIxALLxALL | 111 | HOB & LEI | ALL | ALL |
| YOUTUBE | INT & TELE_COMPxALLxALL | 110 | INT & TELE_COMP | ALL | ALL |
| YOUTUBE | JOBS_EDUxALLxALL | 104 | JOBS_EDU | ALL | ALL |
| YOUTUBE | NEW_BUS_FIN_REALESTATE_LAW&GOV&ALLxALL | 101 | NESS_BUS_FIN_REALESTATE_LAW | ALL | ALL |
| YOUTUBE | OTHERxALLxALL | 107 | OTHER | ALL | ALL |
| YOUTUBE | PETSxALLxALL | 113 | PETS | ALL | ALL |
| YOUTUBE | STOPxALLxALL | 109 | SHOP | ALL | ALL |
| YOUTUBE | STOPxALLxALL | 108 | SPORTS | ALL | ALL |
| YOUTUBE_TV | ALLxALLxALL | 99 | ALL | ALL | ALL |
| YOUTUBE-TV | ALLxALLxALL | 99 | ALL | ALL | ALL |

METHODS, APPARATUS, AND ARTICLES OF MANUFACTURE TO DETERMINE UNIQUE AUDIENCE SIZE VIA CLUSTERED DATA

RELATED APPLICATION

This patent claims the benefit of U.S. Provisional Patent Application No. 63/229,007, which was filed on Aug. 3, 2021. U.S. Provisional Patent Application No. 63/229,007 is hereby incorporated herein by reference in its entirety. Priority to U.S. Provisional Patent Application No. 63/229, 007 is hereby claimed.

FIELD OF THE DISCLOSURE

This disclosure relates generally to computer systems for monitoring audiences and, more particularly, to methods, apparatus, and articles of manufacture to determine unique audience size via clustered data.

BACKGROUND

Audience measurement entities (AMEs) collect audience measurement information from panelists (e.g., individuals who agree to be monitored by the AMEs) including the number of unique audience members for particular media and the number of impressions of the media corresponding to each of the audience members. In some examples, AMEs utilize third-party cookies (e.g., where the AMEs are third parties relative to the entity serving media to a client device) to collect audience measurement information. In such examples, an AME may issue an impression request to the entity serving the media to client devices. Third-party cookie tracking is used by measurement entities to track access to media by client devices from first-party media servers.

BRIEF DESCRIPTION OF THE DRAWINGS

FIG. 11 is a graphical illustration of example clusters disclosed herein.

Figure 1:
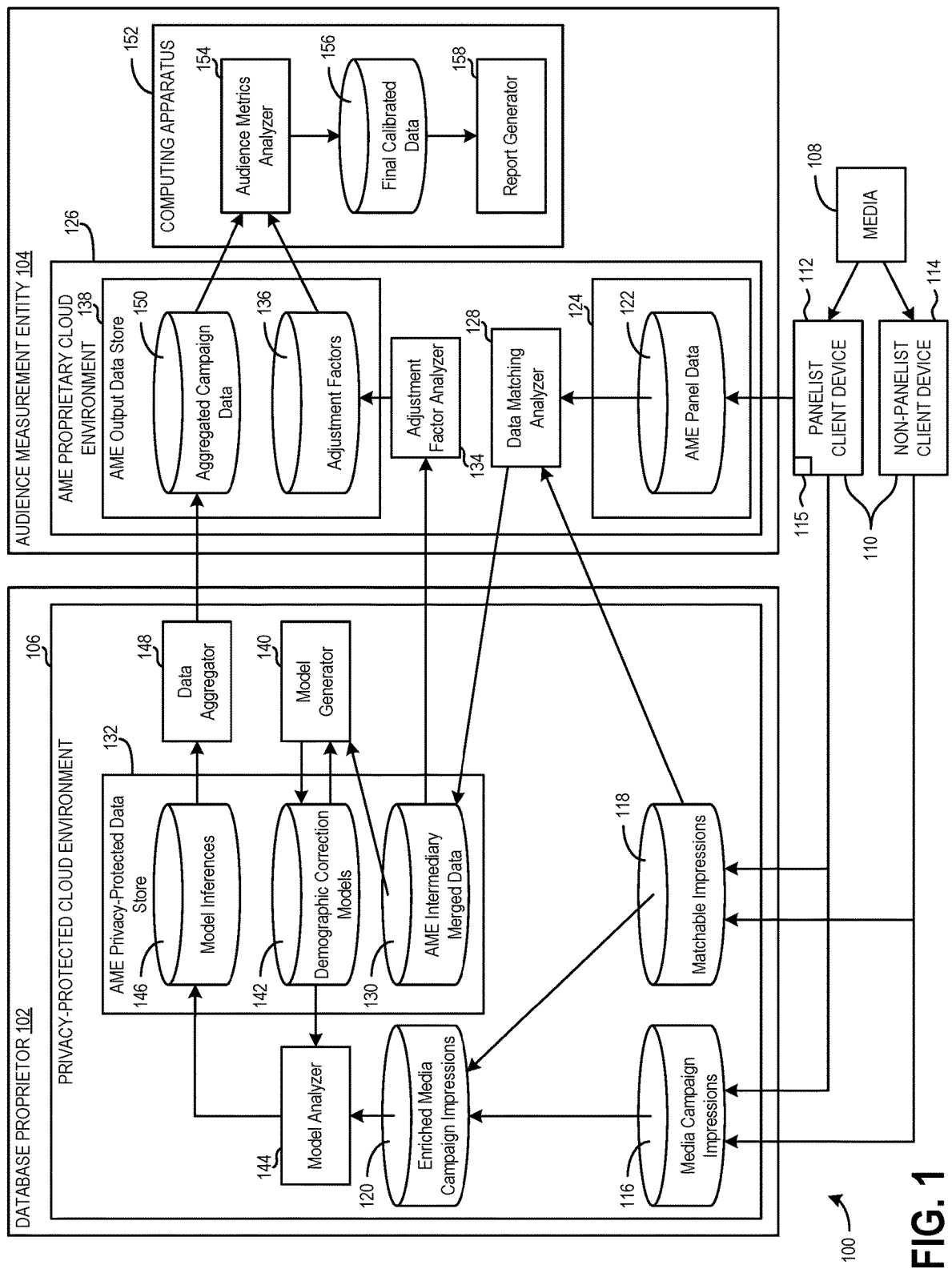
FIG. 1 is a block diagram illustrating an example system to enable the generation of audience measurement metrics based on merging of data collected by a database proprietor and an AME.

The figures are not to scale. In general, the same reference numbers will be used throughout the drawing(s) and accompanying written description to refer to the same or like parts. As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

As used herein, "processor circuitry" is defined to include (i) one or more special purpose electrical circuits structured to perform specific operation(s) and including one or more semiconductor-based logic devices (e.g., electrical hardware implemented by one or more transistors), and/or (ii) one or more general purpose semiconductor-based electrical circuits programmed with instructions to perform specific operations and including one or more semiconductor-based logic devices (e.g., electrical hardware implemented by one or more transistors). Examples of processor circuitry include programmed microprocessors, Field Programmable Gate Arrays (FPGAs) that may instantiate instructions, Central Processor Units (CPUs), Graphics Processor Units (GPUs), Digital Signal Processors (DSPs), XPUs, or microcontrollers and integrated circuits such as Application Specific Integrated Circuits (ASICs). For example, an XPU may be implemented by a heterogeneous computing system including multiple types of processor circuitry (e.g., one or more FPGAs, one or more CPUs, one or more GPUs, one or more DSPs, etc., and/or a combination thereof) and application programming interface(s) (API(s)) that may assign computing task(s) to whichever one(s) of the multiple types of the processing circuitry is/are best suited to execute the computing task(s).

DETAILED DESCRIPTION

AMEs usually collect large amounts of audience measurement information from their panelists including the number of unique audience members for particular media and the number of impressions corresponding to each of the audience members. Unique audience size, as used herein, refers to the total number of unique people (e.g., non-duplicate people) who had an impression of (e.g., were exposed to) a particular media item, without counting duplicate audience members. As used herein, an impression is defined to be an event in which a home or individual accesses and/or is exposed to media (e.g., an advertisement, content, a group of advertisements and/or a collection of content). Impression count, as used herein, refers to the number of times audience members are exposed to a particular media item. The unique audience size associated with a particular media item will always be equal to or less than the number of impressions associated with the media item because, while all audience members by definition have at least one impression of the media, an individual audience member may have more than one impression. That is, the unique audience size is equal to the impression count only when every audience member was exposed to the media only a single time (i.e., the number of audience members equals the number of impressions). Where at least one audience member is exposed to the media multiple times, the unique audience size will be less than the total impression count because multiple impressions will be associated with individual audience members. Thus, unique audience size refers to the number of unique people in an audience (without double counting any person) exposed to media for which audience metrics are being generated. Unique audience size may also be referred to as unique audience, deduplicated audience size, deduplicated audience, or audience.

Techniques for monitoring user access to an Internet-accessible media, such as digital television (TV) (DTV) media and digital content ratings (DCR) media, have evolved significantly over the years. Internet-accessible media is also known as digital media. In the past, such monitoring was done primarily through server logs. In particular, media providers serving media on the Internet would log the number of requests received for their media at their servers. Basing Internet usage research on server logs is problematic for several reasons. For example, server logs can be tampered with either directly or via zombie programs, which repeatedly request media from the server to increase the server log counts. Also, media is sometimes retrieved once, cached locally and then repeatedly accessed from the local cache without involving the server. Server logs cannot track such repeat views of cached media. Thus, server logs are susceptible to both over-counting and under-counting errors.

As Internet technology advanced, the limitations of server logs were overcome through methodologies in which the Internet media to be tracked was tagged with monitoring instructions. In particular, monitoring instructions (also known as a media impression request or a beacon request) are associated with (and/or embedded within) hypertext markup language (HTML) code that causes presentation of the media to be tracked. When a client requests the media, both the media and beacon instructions are downloaded to the client. The beacon instructions are, thus, executed whenever the media is accessed, be it from a server or from a cache.

The beacon instructions cause monitoring data reflecting information about the access to the media (e.g., the occurrence of a media impression) to be sent from the client that downloaded the media to a monitoring server. Typically, the monitoring server is owned and/or operated by an AME (e.g., any party interested in measuring or tracking audience exposures to advertisements, media, and/or any other media) that did not provide the media to the client and who is a trusted third party for providing accurate usage statistics (e.g., The Nielsen Company (US), LLC). Advantageously, because the beacon instructions are associated with the media and executed by the client browser whenever the media is accessed, the monitoring information is provided to the AME irrespective of whether the client is associated with a panelist of the AME. In this manner, the AME is able to track every time a person is exposed to the media on a census-wide or population-wide level. As a result, the AME can reliably determine the total impression count for the media without having to extrapolate from panel data collected from a relatively limited pool of panelists within the population. Frequently, such beacon requests are implemented in connection with third-party cookies. Since the AME is a third party relative to the first party serving the media to the client device, the cookie sent to the AME in the impression request to report the occurrence of the media impression of the client device is a third-party cookie. Third-party cookie tracking is used by audience measurement servers to track access to media by client devices from first-party media servers.

Tracking impressions by tagging media with beacon instructions using third-party cookies is insufficient, by itself, to enable an AME to reliably determine the unique audience size associated with the media if the AME cannot identify the individual user associated with the third-party cookie. That is, the unique audience size cannot be determined because the collected monitoring information does not uniquely identify the person(s) exposed to the media. Under such circumstances, the AME cannot determine whether two reported impressions are associated with the same person or two separate people. The AME may set a third-party cookie on a client device reporting the monitoring information to identify when multiple impressions occur using the same device. However, cookie information does not indicate whether the same person used the client device in connection with each media impression. Furthermore, the same person may access media using multiple different devices that have different cookies so that the AME cannot directly determine when two separate impressions are associated with the same person or two different people.

Furthermore, the monitoring information reported by a client device executing the beacon instructions does not provide an indication of the demographics or other user information associated with the person(s) exposed to the associated media. To at least partially address this issue, the AME establishes a panel of users who have agreed to provide their demographic information and to have their Internet browsing activities monitored. When an individual joins the panel, that person provides corresponding detailed information concerning the person's identity and demographics (e.g., gender, race, income, home location, occupation, etc.) to the AME. The AME sets a cookie on the panelist computer/device that enables the AME to identify the panelist whenever the panelist accesses tagged media and, thus, sends monitoring information to the AME. Additionally or alternatively, the AME may identify the panelists using other techniques (independent of cookies) by, for example, prompting the user to login or identify themselves.

While AMEs are able to obtain user-level information for impressions from panelists (e.g., identify unique individuals associated with particular media impressions), most of the client devices providing monitoring information from the tagged pages are not operated by panelists. Thus, the identity of most people accessing media remains unknown to the AME such that it is necessary for the AME to use statistical methods to impute demographic information based on the data collected for panelists to the larger population of users providing data for the tagged media. However, panel sizes of AMEs remain small compared to the general population of users.

There are many database proprietors operating on the Internet. These database proprietors provide services to large numbers of subscribers. Examples of such database proprietors include social network sites (e.g., Facebook, Twitter, MySpace, etc.), multi-service sites (e.g., Yahoo!, Google, Axiom, Catalina, etc.), online retailer sites (e.g., Amazon.com, Buy.com, etc.), credit reporting sites (e.g., Experian), streaming media sites (e.g., YouTube, Hulu, etc.), etc. In exchange for the provision of services, the subscribers register with the database proprietors. As used herein, the term "registered user" refers to an individual who has established a user account with a database proprietor (e.g., the individual who subscribes to the database proprietor). Database proprietors set cookies and/or other device/user identifiers on the client devices of their registered users to enable the database proprietors to recognize their registered users when their registered users visit website(s) on the Internet domains of the database proprietors.

The protocols of the Internet make cookies inaccessible outside of the domain (e.g., Internet domain, domain name, etc.) on which they were set. Thus, a cookie set in, for example, the YouTube.com domain (e.g., a first party) is accessible to servers in theYouTube.com domain, but not to servers outside that domain. Therefore, although an AME (e.g., a third party) might find it advantageous to access the cookies set by the database proprietors, they are unable to do so. However, techniques have been developed that enable an AME to leverage media impression information collected in association with demographic information in registered user databases of database proprietors to collect more extensive Internet usage data (e.g., beyond the limited pool of individuals participating in an AME panel) by extending the impression request process to encompass partnered database proprietors and by using such partners as interim data collectors. In particular, this task is accomplished by structuring the AME to respond to impression requests from clients (who may not be a member of an audience measurement panel and, thus, may be unknown to the AME) by redirecting the clients from the AME to a database proprietor, such as a social network site partnered with the AME, using an impression response. Such a redirection initiates a communication session between the client accessing the tagged media and the database proprietor. For example, the impression response received from the AME may cause the client to send a second impression request to the database proprietor along with a cookie set by that database proprietor. In response to receiving this impression request, the database proprietor (e.g., YouTube, Facebook, etc.) can access the cookie it has set on the client to thereby identify the client based on the internal records of the database proprietor.

In the event the client corresponds to a registered user of the database proprietor (as determined from the cookie associated with the client), the database proprietor logs/records a database proprietor demographic impression in association with the client/user. As used herein, a demographic impression is an impression that can be matched to particular demographic information of a particular registered user of the services of a database proprietor. The database proprietor has the demographic information for the particular registered user because the registered user would have provided such information when setting up an account to subscribe to the services of the database proprietor.

Sharing of demographic information associated with registered users of database proprietors enables AMEs to extend or supplement their panel data with substantially reliable demographics information from external sources (e.g., database proprietors), thus extending the coverage, accuracy, and/or completeness of their demographics-based audience measurements. Such access also enables the AME to monitor persons who would not otherwise have joined an AME panel. Any web service provider having a database identifying demographics of a set of individuals may cooperate with the AME. Such web service providers may be referred to as "database proprietors" and include, for example, wireless service carriers, mobile software/service providers, social media sites (e.g., Facebook, Twitter, MySpace, etc.), online retailer sites (e.g., Amazon.com, Buy.com, etc.), multi-service sites (e.g., Yahoo!, Google, Experian, etc.), streaming media sites (e.g., YouTube, Hulu, etc.), and/or any other Internet sites that collect demographic data of users and/or otherwise maintain user registration records. The use of demographic information from disparate data sources (e.g., high-quality demographic information from the panels of an audience measurement entity and/or registered user data of database proprietors) results in improved reporting effectiveness of metrics for both online and offline advertising campaigns.

The above approach to generating audience metrics by an AME depends upon the beacon requests (or tags) associated with the media to be monitored to enable an AME to obtain census wide impression counts (e.g., impressions that include the entire population exposed to the media regardless of whether the audience members are panelists of the AME). Further, the above approach also depends on third-party cookies to enable the enrichment of the census impressions with demographic information from database proprietors. However, in more recent years, there has been a movement away from the use of third-party cookies by third parties. Thus, while media providers (e.g., database proprietors) may still use first-party cookies to collect first-party data, the elimination of third-party cookies prevents the tracking of Internet media by AMEs (outside of client devices associated with panelists for which the AME has provided a meter to track Internet usage behavior).

Furthermore, independent of the use of cookies, some database proprietors are moving towards the elimination of third party impression requests or tags (e.g., redirect instructions) embedded in media (e.g., beginning in 2020, third-party tags will no longer be allowed on Youtube.com and other Google Video Partner (GVP) sites). As technology moves in this direction, AMEs (e.g., third parties) will no longer be able to track census wide impressions of media in the manner they have in the past. Furthermore, AMEs will no longer be able to send a redirect request to a client accessing media to cause a second impression request to a database proprietor to associate the impression with demographic information. Thus, the only Internet media monitoring that AMEs will be able to directly perform in such a system will be with panelists that have agreed to be monitored using different techniques that do not depend on third-party cookies and/or tags.

Examples disclosed herein overcome at least some of the limitations that arise out of the elimination of third-party cookies and/or third-party tags by enabling the merging of high-quality demographic information from the panels of an AME with media impression data that continues to be collected by database proprietors. As mentioned above, while third-party cookies and/or third-party tags may be eliminated, database proprietors that provide and/or manage the delivery of media accessed online are still able to track impressions of the media (e.g., via first-party cookies and/or first-party tags). Furthermore, database proprietors are still able to associate demographic information with the impressions whenever the impressions can be matched to a particular registered user of the database proprietor for which demographic information has been collected (e.g., when the user registered with the database proprietor). In some examples, AME panel data and database proprietor impressions data are merged in a privacy-protected cloud environment maintained by the database proprietor. In additional or alternative examples, AME panel data and database proprietor impressions data are merged in a proprietary environment of the AME.

More particularly, FIG. 1 is a block diagram illustrating an example system 100 to enable the generation of audience measurement metrics based on the merging of data collected by a database proprietor 102 and an AME 104. More particularly, in some examples, the data includes AME panel data (that includes media impressions for panelists that are associated with high-quality demographic information collected by the AME 104) and database proprietor impressions data (which may be enriched with demographic and/or other information available to the database proprietor 102). In the illustrated example, these disparate sources of data are combined within a privacy-protected cloud environment 106 managed and/or maintained by the database proprietor 102. The privacy-protected cloud environment 106 is a cloud-based environment that enables media providers (e.g., advertisers and/or content providers) and third parties (e.g., the AME 104) to input and combine their data with data from the database proprietor 102 inside a data warehouse or data store that enables efficient big data analysis. The combining of data from different parties (e.g., different Internet domains) presents risks to the privacy of the data associated with individuals represented by the data from the different parties. Accordingly, the privacy-protected cloud environment 106 is established with privacy constraints that prevent any associated party (including the database proprietor 102) from accessing private information associated with particular individuals. Rather, any data extracted from the privacy-protected cloud environment 106 following a big data analysis and/or query is limited to aggregated information. A specific example of the privacy-protected cloud environment 106 is the Ads Data Hub (ADH) developed by Google.

As used herein, a media impression is defined as an occurrence of access and/or exposure to media 108 (e.g., an advertisement, a movie, a movie trailer, a song, a web page banner, etc.). Examples disclosed herein may be used to monitor for media impressions of any one or more media types (e.g., video, audio, a web page, an image, text, etc.). In examples disclosed herein, the media 108 may be primary content and/or advertisements. Examples disclosed herein are not restricted for use with any particular type of media. On the contrary, examples disclosed herein may be implemented in connection with tracking impressions for media of any type or form in a network.

In the illustrated example of FIG. 1, content providers and/or advertisers distribute the media 108 via the Internet to users that access websites and/or online television services (e.g., web-based TV, Internet protocol TV (IPTV), etc.). For example, content providers and/or advertisers may provide the media 108 as video on demand (VOD), (e.g., YouTube, Pluto TV, Xumo, Vudu, etc.) and/or streaming television packages (e.g., YouTube TV, Sling TV, etc.) that may be streamed to a TV (e.g., a connected TV (CTV)) connected to an over-the-top (OTT) device such as a Roku Streaming Stick, an Amazon Fire TV Stick, etc.

For purposes of explanation, examples disclosed herein are described assuming the media 108 is an advertisement that may be provided in connection with particular content of primary interest to a user. In some examples, the media 108 is served by media servers managed by and/or associated with the database proprietor 102 that manages and/or maintains the privacy-protected cloud environment 106. For example, the database proprietor 102 may be Google, and the media 108 corresponds to ads served with videos accessed via https://www.youtube.com (e.g., the free-to-use version of YouTube, referred to as YouTube Main, which may be accessed via a browser and/or via an application on an OTT device, on a Smart TV, on a smart phone, on a tablet, etc.), via https://tv.youtube.com (e.g., the paid streaming television package of YouTube, referred to as YouTube TV, which may be accessed via a browser and/or via an application on an OTT device, on a Smart TV, on a smart phone, on a tablet, etc.), and/or via other GVPs. More generally, in some examples, the database proprietor 102 includes corresponding database proprietor servers that can serve media 108 to individuals via client devices 110.

In the illustrated example of FIG. 1, the client devices 110 may be stationary or portable computers, handheld computing devices, smart phones, Internet appliances, smart televisions, OTT devices, CTVs, and/or any other type of device that may be connected to the Internet and capable of presenting media. For purposes of explanation, the client devices 110 of FIG. 1 include panelist client devices 112 and non-panelist client devices 114 to indicate that at least some individuals that access and/or are exposed to the media 108 correspond to panelists who have provided detailed demographic information to the AME 104 and have agreed to enable the AME 104 to track their exposure to the media 108. In many situations, other individuals who are not panelists will also be exposed to the media 108 (e.g., via the non-panelist client devices 114). Typically, the number of non-panelist audience members for a particular media item will be significantly greater than the number of panelist audience members. In some examples, the panelist client devices 112 may include and/or implement an audience measurement meter 115 that captures the impressions of media 108 accessed by the panelist client devices 112 (along with associated information) and reports the same to the AME 104. In some examples, the audience measurement meter 115 may be a separate device from the panelist client device 112 used to access the media 108.

In some examples, the media 108 is associated with a unique impression identifier (e.g., a consumer playback nonce (CPN)) generated by the database proprietor 102. In some examples, the impression identifier serves to uniquely identify a particular impression of the media 108. Thus, even though the same media 108 may be served multiple times, each time the media 108 is served the database proprietor 102 will generate a new and different impression identifier so that each impression of the media 108 can be distinguished from every other impression of the media. In some examples, the impression identifier is encoded into a uniform resource locator (URL) used to access the primary content (e.g., a particular YouTube Main video and/or a particular YouTube TV program) along with which the media 108 (as an advertisement) is served. In some examples, with the impression identifier (e.g., CPN) encoded into the URL associated with the media 108, the audience measurement meter 115 extracts the identifier at the time that a media impression occurs so that the AME 104 is able to associate a captured impression with the impression identifier.

In some examples, the meter 115 may not be able to obtain the impression identifier (e.g., CPN) to associate with a particular media impression. For instance, in some examples where the panelist client device 112 is a mobile device, the meter 115 collects a mobile advertising identifier (MAID) and/or an identifier for advertisers (IDFA) that may be used to uniquely identify client devices 110 (e.g., the panelist client devices 112 being monitored by the AME 104). In some examples, the meter 115 reports the MAID and/or IDFA for the particular device associated with the meter 115 to the AME 104. The AME 104, in turn, provides the MAID and/or IDFA to the database proprietor 102 in a double blind exchange through which the database proprietor 102 provides the AME 104 with the impression identifiers (e.g., CPNs) associated with the client device 110 identified by the MAID and/or IDFA. Once the AME 104 receives the impression identifiers for the client device 110 (e.g., a particular panelist client device 112), the impression identifiers are associated with the impressions previously collected in connection with the device.

In the illustrated example, the database proprietor 102 logs each media impression occurring on any of the client devices 110 within the privacy-protected cloud environment 106. In some examples, logging an impression includes logging the time the impression occurred and the type of client device 110 (e.g., whether a desktop device, a mobile device, a tablet device, etc.) on which the impression occurred. Further, in some examples, impressions are logged along with the impression's unique impression identifier. In this example, the impressions and associated identifiers are logged in a campaign impressions database 116. The campaign impressions database 116 stores all impressions of the media 108 regardless of whether any particular impression was detected from a panelist client device 112 or a non-panelist client device 114. Furthermore, the campaign impressions database 116 stores all impressions of the media 108 regardless of whether the database proprietor 102 is able to match any particular impression to a particular registered user of the database proprietor 102.

As mentioned above, in some examples, the database proprietor 102 identifies a particular registered user (e.g., subscriber) associated with a particular media impression based on a cookie stored on the client device 110. In some examples, the database proprietor 102 associates a particular media impression with a registered user that was signed into the online services of the database proprietor 102 at the time the media impression occurred. In some examples, in addition to logging such impressions and associated identifiers in the campaign impressions database 116, the database proprietor 102 separately logs such impressions in a matchable impressions database 118. As used herein, a matchable impression is an impression that the database proprietor 102 is able to match to at least one of a particular registered user (e.g., because the impression occurred on a client device 110 on which a registered user was signed into the database proprietor 102) or a particular client device 110 (e.g., based on a first-party cookie of the database proprietor 102 detected on the client device 110). In some examples, if the database proprietor 102 cannot match a particular media impression (e.g., because no registered user was signed in at the time the media impression occurred and there is no recognizable cookie on the associated client device 110) the impressions is omitted from the matchable impressions database 118 but is still logged in the campaign impressions database 116.

As indicated above, the matchable impressions database 118 includes media impressions (and associated unique impression identifiers) that the database proprietor 102 is able to match to a particular user that has registered with the database proprietor 102. In some examples, the matchable impressions database 118 also includes user-based covariates that correspond to the particular registered user to which each impression in the matchable impressions database 118 was matched. As used herein, a user-based covariate refers to any item(s) of information collected and/or generated by the database proprietor 102 that can be used to identify, characterize, quantify, and/or distinguish particular registered users and/or their associated behavior.

For example, user-based covariates may include the name, age, and/or gender of the registered user (and/or any other demographic information about the registered user) collected at the time the registered user registered with the database proprietor 102, and/or the relative frequency with which the registered user uses the different types of client device 110, the number of media items the registered user has accessed during a most recent period of time (e.g., the last 30 days), the search terms entered by the registered user during a most recent period of time (e.g., the last 30 days), feature embeddings (numerical representations) of classifications (e.g., genres) of videos viewed and/or searches entered by the registered user, etc. As mentioned above, the matchable impressions database 118 also includes impressions matched to particular client devices 110 (based on first-party cookies), even when the impressions cannot be matched to particular registered users (based on the registered users being signed in at the time). In some such examples, the impressions matched to particular client devices 110 are treated as distinct users within the matchable impressions database 118. However, as no particular user can be identified, such impressions in the matchable impressions database 118 will not be associated with any user-based covariates.

Although only one campaign impressions database 116 is shown in the illustrated example, the privacy-protected cloud environment 106 may include any number of campaign impressions databases 116, with each database storing impressions corresponding to different media campaigns associated with one or more different advertisers (e.g., product manufacturers, service providers, retailers, advertisement servers, etc.). In other examples, a single campaign impressions database 116 may store the impressions associated with multiple different campaigns. In some such examples, the campaign impressions database 116 may store a campaign identifier in connection with each impression to identify the particular campaign to which the impression is associated. Similarly, in some examples, the privacy-protected cloud environment 106 may include one or more matchable impressions databases 118 as appropriate. Further, in some examples, the campaign impressions database 116 and the matchable impressions database 118 may be combined and/or represented in a single database.

In the illustrated example of FIG. 1, impressions occurring on the client devices 110 are shown as being reported (e.g., via network communications) directly to both the campaign impressions database 116 and the matchable impressions database 118. However, this should not be interpreted as necessarily requiring multiple separate network communications from the client devices 110 to the database proprietor 102. Rather, in some examples, notifications of impressions are collected from a single network communication from the client device 110, and the database proprietor 102 then populates both the campaign impressions database 116 and the matchable impressions database 118. In some examples, the matchable impressions database 118 is generated based on an analysis of the data in the campaign impressions database 116. Regardless of the particular process by which the two databases 116, 118 are populated with logged impressions, in some examples, the user-based covariates included in the matchable impressions database 118 may be combined with the logged impressions in the campaign impressions database 116 and stored in an enriched impressions database 120. Thus, the enriched impressions database 120 includes all (e.g., census wide) logged impressions of the media 108 for the relevant advertising campaign and also includes all available user-based covariates associated with each of the logged impressions that the database proprietor 102 was able to match to a particular registered user.

As shown in the illustrated example, whereas the database proprietor 102 is able to collect impressions from both panelist client devices 112 and non-panelist client devices 114, the AME 104 is limited to collecting impressions from panelist client devices 112. In some examples, the AME 104 also collects the impression identifier associated with each collected media impression so that the collected impressions may be matched with the impressions collected by the database proprietor 102 as described further below. In the illustrated example, the impressions (and associated impression identifiers) of the panelists are stored in an AME panel data database 122 that is within an AME first party data store 124 in an AME proprietary cloud environment 126.

In some examples, the AME proprietary cloud environment 126 is a cloud-based storage system (e.g., a Google Cloud Project) provided by the database proprietor 102 that includes functionality to enable interfacing with the privacy-protected cloud environment 106 also maintained by the database proprietor 102. As mentioned above, the privacy-protected cloud environment 106 is governed by privacy constraints that prevent any party (with some limited exceptions for the database proprietor 102) from accessing private information associated with particular individuals. By contrast, the AME proprietary cloud environment 126 is indicated as proprietary because it is exclusively controlled by the AME 104 such that the AME 104 has full control and access to the data without limitation. While some examples involve the AME proprietary cloud environment 126 being a cloud-based system that is provided by the database proprietor 102, in other examples, the AME proprietary cloud environment 126 may be provided by a third party distinct from the database proprietor 102.

While the AME 104 is limited to collected impressions (and associated identifiers) from only panelists (e.g., via the panelist client devices 112), the AME 104 is able to collect panel data that is much more robust than merely media impressions. As mentioned above, the panelist client devices 112 are associated with users that have agreed to participate on a panel of the AME 104. Participation in a panel includes the provision of detailed demographic information about the panelist and/or all members in the panelist's household. Such demographic information may include age, gender, race, ethnicity, education, employment status, income level, geographic location of residence, etc. In addition to such demographic information, which may be collected at the time a user enrolls as a panelist, the panelist may also agree to enable the AME 104 to track and/or monitor various aspects of the user's behavior. For example, the AME 104 may monitor panelists' Internet usage behavior including the frequency of Internet usage, the times of day of such usage, the websites visited, and the media exposed to (from which the media impressions are collected).

AME panel data (including media impressions and associated identifiers, demographic information, and Internet usage data) is shown in FIG. 1 as being provided directly to the AME panel data database 122 from the panelist client devices 112. However, in some examples, there may be one or more intervening operations and/or components that collect and/or process the collected data before it is stored in the AME panel data database 122. For instance, in some examples, impressions are initially collected and reported to a separate server and/or database that is distinct from the AME proprietary cloud environment 126. In some such examples, this separate server and/or database may not be a cloud-based system. Further, in some examples, such a non-cloud-based system may interface directly with the privacy-protected cloud environment 106 such that the AME proprietary cloud environment 126 may be omitted entirely.

In some examples, there may be multiple different techniques and/or methodologies used to collect the AME panel data that depends on the particular circumstances involved. For example, different monitoring techniques and/or different types of audience measurement meters 115 may be employed for media accessed via a desktop computer relative to the media accessed via a mobile computing device and/or relative to media accessed via an OTT device on a CTV.

In some examples, the audience measurement meter 115 may be implemented as a software application that panelists agree to install on their devices to monitor all Internet usage activity on the respective devices. In some examples, the meter 115 may prompt a user of a particular device to identify themselves so that the AME 104 can confirm the identity of the user (e.g., whether it was the mother or daughter in a panelist household). In some examples, prompting a user to self-identify may be considered overly intrusive. Accordingly, in some such examples, the circumstances surrounding the behavior of the user of a panelist client device 112 (e.g., time of day, type of content being accessed, etc.) may be analyzed to infer the identity of the user to some confidence level (e.g., the accessing of children's content in the early afternoon would indicate a relatively high probability that a child is using the device at that point in time). In some examples, the audience measurement meter 115 may be a separate hardware device that is in communication with a particular panelist client device 112 and enabled to monitor the Internet usage of the panelist client device 112.

In some examples, the processes and/or techniques used by the AME 104 to capture panel data (including media impressions and who in particular was exposed to the media) can differ depending on the nature of the panelist client device 112 through which the media was accessed. For instance, in some examples, the identity of the individual using the panelist client device 112 may be based on the individual responding to a prompt to self-identify. In some examples, such prompts are limited to desktop client devices and/or OTT devices because such a prompt is viewed as overly intrusive on a mobile device. However, without specifically prompting a user of a mobile device to self-identify, there often is no direct way to determine whether the user is the primary user of the device (e.g., the owner of the device) or someone else (e.g., a child of the primary user). Thus, there is the possibility of misattribution of media impressions within the panel data collected using mobile devices. In some examples, to overcome the issue of misattribution in the panel data, the AME 104 may develop a machine learning model that can predict the true user of a mobile device (or any device for that matter) based on information that the AME 104 knows for certain and/or to which the AME 104 has access. For example, inputs to the machine learning model may include the composition of the panelist household, the type (e.g., genre and/or category) of the content, the daypart or time of day when the content was accessed, etc. In some examples, the truth data used to generate and validate such a model may be collected through field surveys in which the above input features are tracked and/or monitored for a subset of panelists that have agreed to be monitored in this manner (which is more intrusive than the typical passive monitoring of content accessed via mobile devices).

As mentioned above, in some examples, the AME panel data (stored in the AME panel data database 122) is merged with the database proprietor impressions data (stored in the matchable impressions database 118) within the AME proprietary cloud environment 126 to take advantage of the combination of the disparate sets of data to generate more robust and/or reliable audience measurement metrics. In particular, the database proprietor impressions data provides the advantage of volume. That is, the database proprietor impressions data corresponds to a much larger number of impressions than the AME panel data because the database proprietor impressions data includes census wide impression information that includes all impressions collected from both the panelist client devices 112 (associated with a relatively small pool of audience members) and the non-panelist client devices 114. The AME panel data provides the advantage of high-quality demographic data for a statistically significant pool of audience members (e.g., panelists) that may be used to correct for errors and/or biases in the database proprietor impressions data.

One source of error in the database proprietor impressions data is that the demographic information for matchable users collected by the database proprietor 102 during user registration may not be truthful. In particular, in some examples, many database proprietors impose age restrictions on their user accounts (e.g., a user must be at least 13 years of age, at least 18 years of age, etc. to register with the database proprietor 102). However, when a person registers with the database proprietor 102, the person typically self-declares their age and, therefore, may lie about their age (e.g., an 11-year-old may say they are 18 to bypass the age restrictions for a user account). Independent of age restrictions, a particular user may choose to enter an incorrect age for any other reason or no reason at all when registering with the database proprietor 102 (e.g., a 44-year-old may choose to assert they are only 25). Where the database proprietor 102 does not verify the self-declared age of registered users, there is a relatively high likelihood that the ages of at least some registered users of the database proprietor 102 stored in the matchable impressions database 118 (as a particular user-based covariate) are inaccurate. Further, it is possible that other self-declared demographic information (e.g., gender, race, ethnicity, income level, etc.) may also be falsified by users during registration and/or may otherwise be inaccurate.

As described further below, the AME panel data (which contains reliable demographic information about the panelists) can be used to correct for inaccurate demographic information in the database proprietor impressions data. Additionally, while the self-declared age of a particular registered user may be truthful and accurate, a different person of a different age may end up using a client device 110 on which the particular registered user is logged into the user account. For example, a child may access media on a client device 110 in which a parent of the child is logged into a user account of the database proprietor 102. As a result, media accessed by the child would be misattributed to the demographics (e.g., the self-declared age) of the parent.

Thus, even when self-declared demographic information is true, it may nevertheless be wrong with respect to the demographic characteristics of the person actually using the user account at any given point in time. This scenario is more common for client devices and/or user accounts that are used and/or shared by multiple different people (e.g., different members in a single household). As used herein, the term "shared user account" refers to a user account that is used by more than one panelist. As such, shared user accounts include user accounts that are intended to be shared by multiple individuals as well as user accounts that, as a matter of happenstance, are used by multiple individuals (e.g., a child inadvertently remains logged into their parent's user account after the parent used the same computer).

Another source of error in the database proprietor impressions data is based on the concept of misattribution, which arises in situations where multiple different people use the same client device 110 to access media. In some examples, the database proprietor 102 associates a particular impression to a particular registered user based on the registered user being signed into a platform provided by the database proprietor 102. For example, if a particular person signs into their Google account and begins watching a YouTube Main video on a particular client device 110, that person will be attributed with an impression for an ad served during the video because the person was signed in at the time. However, there may be instances where the person finishes using the client device 110 but does not sign out of his or her Google account. Thereafter, a second different person (e.g., a different member in the family of the first person) begins using the client device 110 to view another YouTube Main video. Although the second person is now accessing media via the client device 110, ad impressions during this time will still be attributed to the first person because the first person is the one who is still indicated as being signed in (e.g., the user account of the first person has become a shared user account).

Thus, there is likely to be circumstances where the actual person exposed to media 108 is misattributed to a different registered user of the database proprietor 102 and/or an unregistered user. The AME panel data (which includes an indication of the actual person using the panelist client devices 112 at any given moment) can be used to correct for misattribution in the demographic information in the database proprietor impressions data. As mentioned above, in some situations, the AME panel data may itself include misattribution errors. Accordingly, in some examples, the AME panel data may first be corrected for misattribution before the AME panel data is used to correct misattribution in the database proprietor impressions data. An example methodology to correct for misattribution in the database proprietor impressions data is described in Singh et al., U.S. Pat. No. 10,469,903, which is hereby incorporated herein by reference in its entirety.

Misattribution can also occur where there are multiple shared user accounts on the same device. For example, a parent may log into his or her user account and forget to log out after using a communal desktop computer. Subsequently, a child may use the computer for a time before realizing that the parent's user account is logged in. Accordingly, when multiple shared user accounts are present in a panelist household, self-declared demographic information may be wrong with respect to the demographic characteristics of the person actually using the user account at any given point in time for multiple accounts. Here, as described above, the AME panel data (which includes an indication of the actual person using the panelist client devices 112 at any given moment) can be used to correct for misattribution in the demographic information in the database proprietor impressions data.

Another problem with the database proprietor impressions data is that of non-coverage. Non-coverage refers to impressions recorded by the database proprietor 102 that cannot be matched to a particular registered user of the database proprietor 102. The inability of the database proprietor 102 to match a particular impression to a particular user can occur for several reasons including that the registered user is not signed in at the time of the media impression, that the user has not established an account with the database proprietor 102, that the registered user has enabled Limited Ad Tracking (LAT) to prevent the user account from being associated with ad impressions, or that the content associated with the media being monitored corresponds to children's content (for which user-based tracking is not performed). While the inability of the database proprietor 102 to match and assign a particular impression to a particular registered user is not necessarily an error in the database proprietor impressions data, it does undermine the ability to reliably estimate the total unique audience size for (e.g., the number of unique individuals that were exposed to) a particular media item.

For example, assume that the database proprietor 102 records a total of 11,000 impressions for media 108 in a particular advertising campaign. Further assume that of those 11,000 impressions, the database proprietor 102 is able to match 10,000 impressions to a total of 5,000 different users (e.g., each user was exposed to the media on average 2 times) but is unable to match the remaining 1,000 impressions to particular users. Relying solely on the database proprietor impressions data, in this example, there is no way to determine whether the remaining 1,000 impressions should also be attributed to the 5,000 users already exposed at least once to the media 108 (for a total audience size of 5,000 people) or if one or more of the remaining 1,000 impressions should be attributed to other users not among the 5,000 already identified (for a total audience size of up to 6,000 people (if every one of the 1,000 impressions was associated with a different person not included in the matched 5,000 users)). In some examples disclosed herein, the AME panel data can be used to estimate the distribution of impressions across different users associated with the non-coverage portion of impressions in the database proprietor impressions data to thereby estimate a total audience size for the relevant media 108.

Another confounding factor to the estimation of the total unique audience size for media based on the database proprietor impressions data is the existence of multiple user accounts of a single registered user. More particular, in some situations a particular individual may establish multiple accounts (e.g., two or more user accounts) with the database proprietor 102 for different purposes (e.g., a personal account, a work account, a shared user account, etc.). Such a situation can result in a larger number of different users being identified as audience members to media 108 than the actual number of individuals exposed to the media 108. For example, assume that a particular person registers three user accounts with the database proprietor 102 and is exposed to the media 108 once while signed into each of the three different accounts for a total of three impressions. In this scenario, the database proprietor 102 would match each impression to a different registered user based on the different user accounts making it appear that three different people were exposed to the media 108 when, in fact, only one person was exposed to the media three different times. Examples disclosed herein use the AME panel data in conjunction with the database proprietor impressions data to estimate an actual unique audience size from the potentially inflated number of apparently unique users exposed to the media 108.

In the illustrated example of FIG. 1, the AME panel data is merged with the database proprietor impressions data by an example data matching analyzer 128. In some examples, the data matching analyzer 128 implements an application programming interface (API) that takes the disparate datasets and matches registered users in the database proprietor impressions data with panelists in the AME panel data. In some examples, registered users are matched with panelists based on the unique impression identifiers (e.g., CPNs) collected in connection with the media impressions logged by both the database proprietor 102 and the AME 104. Additionally or alternatively, the data matching analyzer 128 matches user accounts registered with the database proprietor 102 to panelists of the AME 104 based on personal identifiable information (PII) associated with the user accounts and panelists. Based on the comparison, the data matching analyzer 128 extracts and causes storage of impression identifiers (e.g., CPNs) for the matching user accounts, values for demographics (e.g., covariates) of the matching user accounts, and values for demographics of the panelists as reported in the AME panel data.

In some examples, the data matching analyzer 128 utilizes watermark matching to match registered users in the database proprietor impressions data with panelists in the AME panel data. For example, when an audience member utilizes an application (e.g., YouTube Main and/or YouTube TV) on a device, media presented via the device may trigger a watermark ping on the device. In such an example, the meter 115 detects the watermark ping and a player identifier (ID) associated therewith. In this manner, various meters deployed to panelist households detect respective player IDs associated with the AME panel data.

In the example of FIG. 1, a watermark ping causes the browser and/or application to send a request (sometimes referred to herein as a "beacon request") to a data collection facility such as a server that is associated with the AME 104. In some examples, the beacon request is an HTTP request (e.g., an HTTP GET request, an HTTP POST request, etc.). The beacon request enables monitoring data reflecting information about the media access to be tracked. To this end, the beacon request carries identification information to be collected, compiled and/or analyzed at the AME server. The identification information may include a user agent string to identify the user device on which the media is requested, a media identifier to identify the media with which the watermark ping is associated (e.g., a website address), a host identifier to identify the host (e.g., web server) with which the requested media is associated (e.g., a vendor identifier (VID)), a time stamp to identify the dates/times at which the media is requested, accessed and/or received, one or more command identifiers identifying control commands (e.g., pause, play, stop, etc.) acted upon the media, etc.

In the example of FIG. 1, the database proprietor impressions data also records watermark pings. As such, in some examples, the data matching analyzer 128 matches user accounts registered with the database proprietor 102 to panelists of the AME 104 based on watermark pings associated with the user accounts and panelists. Based on the comparison, the data matching analyzer 128 extracts and causes storage of impression identifiers (e.g., CPNs) for the matching user accounts, values for demographics of the panelists as reported in the AME panel data, and other AME panel data (e.g., the number of viewing events for a particular demographic, the number of viewers per viewing event, etc.). In the example of FIG. 1, the combined data is stored in an AME intermediary merged data database 130 within an AME privacy-protected data store 132. The data in the AME intermediary merged data database 130 is referred to as "intermediary" because it is at an intermediate stage in the processing because it includes AME panel data that has been enhanced and/or combined with the database proprietor impressions data but has not yet been corrected or adjusted to account for the sources of error and/or bias in the database proprietor impressions data as outlined above.

In some examples, the data matching analyzer 128 includes means for matching. For example, the means for matching may be implemented by the data matching analyzer 128. In some examples, the data matching analyzer 128 may be instantiated by processor circuitry such as the example processor circuitry 712 of FIG. 7. For instance, the data matching analyzer 128 may be instantiated by the example microprocessor 800 of FIG. 8 executing machine executable instructions such as those implemented by at least blocks 502, 504, 506, 508, and 510 of FIG. 5. In some examples, the data matching analyzer 128 may be instantiated by hardware logic circuitry, which may be implemented by an ASIC, XPU, or the FPGA circuitry 900 of FIG. 9 structured to perform operations corresponding to the machine readable instructions. Additionally or alternatively, the data matching analyzer 128 may be instantiated by any other combination of hardware, software, and/or firmware. For example, the data matching analyzer 128 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the AME intermediary merged data is analyzed by an adjustment factor analyzer 134 to calculate adjustment or calibration factors that may be stored in an adjustment factors database 136 within an AME output data store 138 of the AME proprietary cloud environment 126. In some examples, the adjustment factor analyzer 134 calculates different types of adjustment factors to account for different types of errors and/or biases in the database proprietor impressions data. For instance, a multi-account adjustment factor corrects for the situation of a single registered user accessing media using multiple different user accounts associated with the database proprietor 102. A non-coverage adjustment factor corrects for non-coverage associated with registered users that access media while signed out of their account associated with the database proprietor 102 (so that the database proprietor 102 is unable to associate the impression with the registered users) and/or where a user accesses the services of the database proprietor without being logged into a user of the database proprietor 102 (e.g., if the user does not have a registered account with the database proprietor 102). An account sharing adjustment factor corrects for members of the audience of the media 108 that share a user account registered with the databases proprietor 102. A co-viewing adjustment factor corrects for members of the audience of the media 108 that were contemporaneously present at a location of a viewing event of the media 108. For example, for multiple viewing events, the co-viewing adjustment factors correct for members of the audience of the media 108 there were contemporaneously present at respective locations of the viewing events. In some examples, the adjustment factor analyzer 134 is able to directly calculate the multi-account adjustment factor and the non-coverage adjustment factor in a deterministic manner.

While the multi-account adjustment factors and the non-coverage adjustment factors may be deterministically calculated, correcting for falsified or otherwise incorrect demographic information (e.g., incorrectly self-declared ages) of registered users of the database proprietor 102 cannot be solved in such a direct and deterministic manner. Rather, in some examples, a machine learning model is developed to analyze and predict the correct ages of registered users of the database proprietor 102. Specifically, as shown in FIG. 1, the privacy-protected cloud environment 106 implements a model generator 140 to generate a demographic correction model (DCM) using the AME intermediary merged data (stored in the AME intermediary merged data database 130) as inputs.

More particularly, in some examples, self-declared demographics (e.g., the self-declared age) of registered users of the database proprietor 102, along with other covariates associated with the registered users, are used as the input variables or features used to train a model to predict the correct demographics (e.g., correct age) of the registered users as validated by the AME panel data, which serves as the truth data or training labels for the demographic correction model generation. However, in some examples, the self-declared age or other demographics of a registered user signed into a user account on a panelist client device 112 may not match the age or other demographics of the primary user of the user account.

As used herein, the term "primary user of a user account" refers to an individual whose demographic information an AME should attribute to a user account based on a primary user identification algorithm. While in some instances identifying the primary user of a user account may be straightforward (e.g., when a user account is used by only one person), in other cases the identity of the primary user of a user account is not as forthcoming (e.g., when multiple people use the same user account). For example, a parent that buys a computer for a child may log into the computer with the parent's user account with the database proprietor 102 despite the child being the primary user of the parent's user account. Thus, because the registered user of a user account is not always the primary user of the user account, in some examples (e.g., in the case of a shared user account), merely relying on the demographics of the registered user may be insufficient to accurately monitor the demographics of the person exposed to media. By identifying the primary user of the user account, examples disclosed herein determine the demographics of the person that accessed media. Therefore, examples disclosed herein generate reliable demographics and/or other covariates associated with the registered users to train models to predict correct demographics. In this manner, disclosed examples determine one or more sharing factors to correct for demographics and/or other covariates of shared user accounts.

In some examples, different demographic correction model(s) may be developed to correct for different types of demographic information that needs correcting. For instance, in some examples, a first model can be used to correct the self-declared age of registered users of the database proprietor 102 and a second model can be used to correct the self-declared gender of the registered users. Once the model(s) have been trained and validated based on the AME panel data, the model(s) are stored in a demographic correction models database 142.

As mentioned above, there are many different types of covariates collected and/or generated by the database proprietor 102. In some examples, the covariates provided by the database proprietor 102 may include a certain number (e.g., 100) of the top search result click entities and/or video watch entities for every user during a most recent period of time (e.g., for the last month). These entities are integer identifiers (IDs) that map to a knowledge graph of all entities for the search result clicks and/or videos watched. That is, as used in this context, an entity corresponds to a particular node in a knowledge graph maintained by the database proprietor 102.

In some examples, the total number of unique IDs in the knowledge graph may number in the tens of millions. More particularly, for example, YouTube Main videos are classified across roughly 20 million unique video entity IDs and Google search results are classified across roughly 25 million unique search result entity IDs. In addition to the top search result click entities and/or video watch entities, the database proprietor 102 may also provide embeddings for these entities. An embedding is a numerical representation (e.g., a vector array of values) of some class of similar objects, images, words, and the like. For example, a particular user that frequently searches for and/or views cat videos may be associated with a feature embedding representative of the class corresponding to cats. Thus, feature embeddings translate relatively high dimensional vectors of information (e.g., text strings, images, videos, etc.) into a lower dimensional space to enable the classification of different but similar objects.

In some examples, multiple embeddings may be associated with each search result click entity and/or video watch entity. Accordingly, assuming the top 100 search result entities and video watch entities are provided among the covariates and that 16 dimension embeddings are provided for each such entity, this results in a 100×16 matrix of values for every user, which may be too much data to process during generation of the demographic correction models as described above. Accordingly, in some examples, the dimensionality of the matrix is reduced to a more manageable size to be used as an input feature for the demographic correction model generation.

In some examples, a process is implemented to track different demographic correction model experiments over time to achieve high quality (e.g., accurate) models and also for auditing purposes. Accomplishing this objective within the context of the privacy-protected cloud environment 106 presents several unique challenges because the model features (e.g., inputs and hyperparameters) and model performance (e.g., accuracy) are stored separately to satisfy the privacy constraints of the environment. In some examples, a model analyzer 144 may implement and/or use one or more demographic correction models to generate predictions and/or inferences as to the actual demographics (e.g., actual ages) of registered users associated with media impressions logged by the database proprietor 102.

That is, in some examples, as shown in FIG. 1, the model analyzer 144 uses one or more of the demographic correction models in the demographic correction models database 142 to analyze the impressions in the enriched impressions database 120 that were matched to a particular registered user of the database proprietor 102. The inferred demographic (e.g., age) for each registered user may be stored in a model inferences database 146 for subsequent use, retrieval, and/or analysis. Additionally or alternatively, in some examples, the model analyzer 144 uses one or more of the demographic correction models in the demographic correction models database 142 to analyze the entire registered user base of the database proprietor 102 regardless of whether the registered users are matched to any particular media impressions. After inferring the correct demographic (e.g., age) for each registered user, the inferences are stored in the model inferences database 146. In some such examples, when the registered users matched to particular impressions are to be analyzed (e.g., the registered users matched to impressions in the enriched impressions database 120), the model analyzer 144 merely extracts the inferred demographic assignment to each relevant registered user in the enriched impressions database 120 that matches with one or more media impressions.

In the illustrated example of FIG. 1. with inferences made to correct for inaccurate demographic information of database proprietor users (e.g., falsified self-declared ages) and stored in the model inferences database 146, the AME 104 may be interested in extracting audience measurement metrics based on the corrected data. However, as mentioned above, the data contained inside the privacy-protected cloud environment 106 is subject to privacy constraints. In some examples, the privacy constraints ensure that the data can only be extracted for review and/or analysis in aggregate so as to protect the privacy of any particular individual represented in the data (e.g., a panelist of the AME 104 and/or a registered user of the database proprietor 102). Accordingly, in some examples, a data aggregator 148 aggregates the audience measurement data associated with particular media campaigns before the data is provided to an aggregated campaign data database 150 in the AME output data store 138 of the AME proprietary cloud environment 126.

The data aggregator 148 may aggregate data in different ways for different types of audience measurement metrics. For instance, at the highest level, the aggregated data may provide the total impression count and total number of registered users (e.g., estimated audience size) exposed to the media 108 for a particular media campaign. As mentioned above, the total number of registered users reported by the data aggregator 148 is based on the total number of unique user accounts matched to impressions but does not include the individuals associated with impressions that were not matched to a particular registered user (e.g., non-coverage). However, the total number of unique user accounts does not account for the fact that a single individual may correspond to more than one user account (e.g., multi-account users), and does not account for situations where a person other than a registered user was exposed to the media 108 (e.g., misattribution). These errors in the aggregated data may be corrected based on the adjustment factors stored in the adjustment factors database 136. Further, in some examples, the aggregated data may include an indication of the demographic composition of the registered users represented in the aggregated data (e.g., number of males vs females, number of registered users in different age brackets, etc.).

Additionally or alternatively, in some examples, the data aggregator 148 may provide aggregated data that is associated with a particular aspect of a media campaign. For instance, the data may be aggregated based on particular sites (e.g., all media impressions served on YouTube.com). In other examples, the data may be aggregated based on placement information (e.g., aggregated based on particular primary content videos accessed by users when the media advertisement was served). In other examples, the data may be aggregated based on device type (e.g., impressions served via a desktop computer versus impressions served via a mobile device). In other examples, the data may be aggregated based on a combination of one or more of the above factors and/or based on any other relevant factor(s).

In some examples, the privacy constraints imposed on the data within the privacy-protected cloud environment 106 include a limitation that data cannot be extracted (even when aggregated) for less than a threshold number of individuals (e.g., 50 individuals). Accordingly, if the particular metric being sought includes less than the threshold number of individuals, the data aggregator 148 will not provide such data. For instance, if the threshold number of individuals is 50 but there are only 46 females in the age range of 18-25 that were exposed to particular media 108, the data aggregator 148 would not provide the aggregate data for females in the 18-25 age bracket. Such privacy constraints can leave gaps in the audience measurement metrics, particularly in locations where the number of panelists is relatively small. Accordingly, in some examples, when audience measurement is not available for a particular demographic segment of interest in a particular region (e.g., a particular country), the audience measurement metrics in one or more comparable region(s) may be used to impute the metrics for the missing data in the first region of interest. In some examples, the particular metrics imputed from comparable regions is based on a comparison of audience metrics for which data is available in both regions. For instance, while data for females in the 18-25 bracket may be unavailable, assume that data for females in the 26-35 age bracket is available. The metrics associated with the 26-35 age bracket in the region of interests may be compared with metrics for the 26-35 age bracket in other regions and the regions with the closest metrics to the region of interest may be selected for use in calculating imputation factor(s). Other techniques to impute impressions to demographics with unreported are possible as described below.

As shown in the illustrated example, both the adjustment factors database 136 and the aggregated campaign data database 150 are included within the AME output data store 138 of the AME proprietary cloud environment 126. As mentioned above, in some examples, the AME proprietary cloud environment 126 is provided by the database proprietor 102 and enables data to be provided to and retrieved from the privacy-protected cloud environment 106. In some examples, the aggregated campaign data and the adjustment factors are subsequently transferred to a separate computing apparatus 152 of the AME 104 for analysis by an audience metrics analyzer 154. In some examples, the separate computing apparatus may be omitted with its functionality provided by the AME proprietary cloud environment 126. In other examples, the AME proprietary cloud environment 126 may be omitted with the adjustment factors and the aggregated data provided directly to the computing apparatus 152. Further, in this example, the AME panel data database 122 is within the AME first party data store 124, which is shown as being separate from the AME output data store 138. However, in other examples, the AME first party data store 124 and the AME output data store 138 may be combined.

In the illustrated example of FIG. 1, the audience metrics analyzer 154 applies the adjustment factors to the aggregated data to correct for errors in the data including misattribution, non-coverage, multi-count users, and co-viewing. The output of the audience metrics analyzer 154 corresponds to the final calibrated data of the AME 104 and is stored in a final calibrated data database 156. In this example, the computing apparatus 152 also includes a report generator 158 to generate reports based on the final calibrated data.

Figure 2:
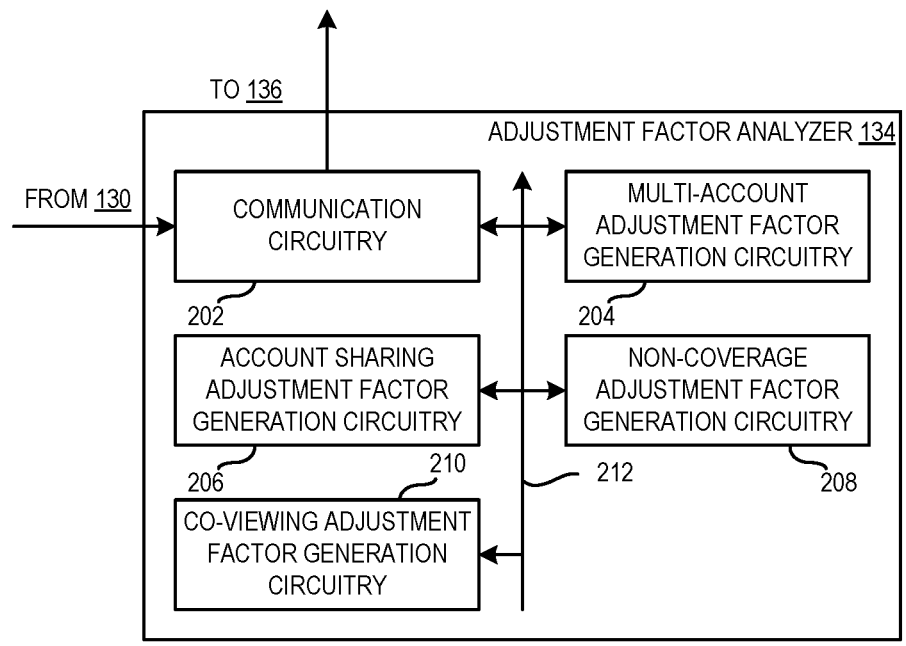
FIG. 2 is a block diagram of an example implementation of the example adjustment factor analyzer of FIG. 1.

FIG. 2 is a block diagram of an example implementation of the example adjustment factor analyzer 134 of FIG. 1. In the example of FIG. 2, the adjustment factor analyzer 134 includes example communication circuitry 202, example multi-account adjustment factor generation circuitry 204, example account sharing adjustment factor generation circuitry 206, example non-coverage adjustment factor generation circuitry 208, and example co-viewing adjustment factor generation circuitry 210. In the example of FIG. 2, any of the communication circuitry 202, the multi-account adjustment factor generation circuitry 204, the account sharing adjustment factor generation circuitry 206, the non-coverage adjustment factor generation circuitry 208, and/or the co-viewing adjustment factor generation circuitry 210 can communicate via an example communication bus 212.

In the illustrated example of FIG. 2, the adjustment factor analyzer 134 may be instantiated (e.g., creating an instance of, bring into being for any length of time, materialize, implement, etc.) by processor circuitry such as a central processing unit executing instructions. Additionally or alternatively, the adjustment factor analyzer 134 of FIG. 2 may be instantiated (e.g., creating an instance of, bring into being for any length of time, materialize, implement, etc.) by an ASIC or an FPGA structured to perform operations corresponding to the instructions. It should be understood that some or all of the circuitry of FIG. 2 may, thus, be instantiated at the same or different times. Some or all of the circuitry may be instantiated, for example, in one or more threads executing concurrently on hardware and/or in series on hardware. Moreover, in some examples, some or all of the circuitry of FIG. 2 may be implemented by microprocessor circuitry executing instructions to implement one or more virtual machines and/or containers.

In the illustrated example of FIG. 2, the communication circuitry 202 accesses data in the AME intermediary merged data database 130. In some examples, data stored in the AME intermediary merged data database 130 is clustered. For example, impressions are clustered by a combination and/or permutation of the genre of media to which the impressions correspond, daypart (e.g., time of day) during which the media was requested, and device data of the device that requested the media. Additionally, clusters may be distinguished based the inventory type (e.g., YouTube Main or YouTube TV) from which the impressions were generated. Clusters may be subdivided into different demographics reported for the impressions. In some examples, the communication circuitry 202 is instantiated by processor circuitry executing communication instructions and/or configured to perform operations such as those represented by the flowchart of FIG. 5.

In the illustrated example of FIG. 2, the multi-account adjustment factor generation circuitry 204 generates one or more vectors of multi-account adjustment factors for the clusters of data. The example multi-account adjustment vectors include a factor for each demographic subdivision of the clusters. In the example of FIG. 2, the multi-account adjustment factor generation circuitry 204 generates the multi-account adjustment vector(s) based on data about the number of accounts registered users of the database proprietor 102 have had historically (e.g., historic data). In the example of FIG. 2, the multi-account adjustment factors are the same value (e.g., 1) for each demographic subdivision of the clusters. In additional or alternative examples, the multi-account adjustment factors are different values for the demographic subdivision of the clusters. In some examples, the multi-account adjustment factor generation circuitry 204 is instantiated by processor circuitry executing multi-account adjustment factor generation instructions and/or configured to perform operations such as those represented by the flowchart of FIG. 5.

In the illustrated example of FIG. 2, the account sharing adjustment factor generation circuitry 206 generates one or more matrices of account sharing adjustment factors for the clusters of data. The example account sharing adjustment matrices include factors (e.g., respective elements) representing the probability that a user account has first values for demographics (e.g., as reported by the database proprietor 102) if a matching panelist has second values for the demographics. For example, to generate a matrix for a cluster, the account sharing adjustment factor generation circuitry 206 forms a matrix with individual cells that count the matching and non-matching instances of first values of respective demographics reported by the database proprietor 102 for matching user accounts and second values of the respective demographics reported by the AME 104 for matching panelists. An example matrix is illustrated by Table 1 below.

TABLE 1

|  |  | Demographics of User Accounts | | |
|---|---|---|---|---|
|  |  | M 35-39 | F 35-39 | F 13-17 |
| Demographics of Panelists | M 35-39 | 7,000 | 1,500 | 1,500 |
|  | F 35-39 | 1,850 | 3,500 | 1,150 |
|  | F 13-17 | 600 | 900 | 1,000 |

In the example of FIG. 2, the account sharing adjustment factor generation circuitry 206 normalizes the matrix of matching and non-matching instances based on the total count of each demographic subdivision reported in the panelist data. The normalized matrix represents a matrix of account sharing adjustment factors. In some examples, the account sharing adjustment factor generation circuitry 206 is instantiated by processor circuitry executing account sharing adjustment factor generation instructions and/or configured to perform operations such as those represented by the flowchart of FIG. 5. An example account sharing adjustment matrix is illustrated by Table 2 below.

TABLE 2

|  |  | Demographics or User Accounts | | |
|---|---|---|---|---|
|  |  | M 35-39 | F 35-39 | F 13-17 |
| Demographics of Panelists | M 35-39 | 0.7 | 0.15 | 0.15 |
|  | F 35-39 | 0.28 | 0.54 | 0.18 |
|  | F 13-17 | 0.24 | 0.36 | 0.4 |

In the illustrated example of FIG. 2, the non-coverage adjustment factor generation circuitry 208 generates one or more vectors of non-coverage adjustment factors for the clusters of data. The example non-coverage adjustment vectors include a factor for each demographic subdivision of the clusters. In the example of FIG. 2, the non-coverage adjustment factor generation circuitry 208 generates the non-coverage adjustment vector(s) based on historic data indicating that non-coverage adjustment factors greater than one (e.g., >1) provide effective adjustment for non-coverage. In the example of FIG. 2, the non-coverage adjustment factors are the same value (e.g., 1.5) for each demographic subdivision of the clusters. In additional or alternative examples, the non-coverage adjustment factors are different values for the demographic subdivision of the clusters. In some examples, the non-coverage adjustment factor generation circuitry 208 is instantiated by processor circuitry executing non-coverage adjustment factor generation instructions and/or configured to perform operations such as those represented by the flowchart of FIG. 5.

In the illustrated example of FIG. 2, the co-viewing adjustment factor generation circuitry 210 generates one or more vectors of co-viewing adjustment factors for the clusters of data. The example co-viewing adjustment vectors include a factor for each demographic subdivision of the clusters. In the example of FIG. 2, for each demographic subdivision of each cluster, the co-viewing adjustment factor generation circuitry 210 determines a first number of viewing events and a second number of viewers for the viewing events. For example, the AME panel data indicates the number of viewing events (e.g., events where a panelist was viewing media) and the number of viewers present at each viewing event. For example, the AME 104 collects this data based on reporting generated by panelists when the panelists sit down to watch media by the panelists pressing buttons on an AME provided device (e.g., remote control, meter, etc.).

In the example of FIG. 2, the co-viewing adjustment factor generation circuitry 210 generates the co-viewing adjustment vectors by dividing the number of viewers for each demographic subcategory by the number of viewing events for the corresponding demographic subcategory. In some examples, the co-viewing adjustment factor generation circuitry 210 is instantiated by processor circuitry executing co-viewing adjustment factor generation instructions and/or configured to perform operations such as those represented by the flowchart of FIG. 5. Table 3 illustrates example processes that may be executed and/or instantiated by the co-viewing adjustment factor generation circuitry 210 to generate co-viewing factors.

TABLE 3

| Cluster Identifier | AME Viewer Demographic | Viewing Events | Total Viewers | Co-viewing Factor |
|---|---|---|---|---|
| Cluster A | M 35-39 | 1,200 | 1,500 | 1.25 |
| Cluster A | F 35-39 | 4,500 | 5,500 | 1.22 |
| Cluster A | F 13-17 | 900 | 1,000 | 1.11 |

In some examples, the adjustment factor analyzer 134 includes means for communicating. For example, the means for communicating may be implemented by the communication circuitry 202. In some examples, the communication circuitry 202 may be instantiated by processor circuitry such as the example processor circuitry 712 of FIG. 7. For instance, the communication circuitry 202 may be instantiated by the example microprocessor 800 of FIG. 8 executing machine executable instructions such as those implemented by at least block 524 of FIG. 5. In some examples, the communication circuitry 202 may be instantiated by hardware logic circuitry, which may be implemented by an ASIC, XPU, or the FPGA circuitry 900 of FIG. 9 structured to perform operations corresponding to the machine readable instructions. Additionally or alternatively, the communication circuitry 202 may be instantiated by any other combination of hardware, software, and/or firmware. For example, the communication circuitry 202 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the adjustment factor analyzer 134 includes means for generating a multi-account adjustment vector. For example, the means for generating a multi-account adjustment vector may be implemented by the multi-account adjustment factor generation circuitry 204. In some examples, the multi-account adjustment factor generation circuitry 204 may be instantiated by processor circuitry such as the example processor circuitry 712 of FIG. 7. For instance, the multi-account adjustment factor generation circuitry 204 may be instantiated by the example microprocessor 800 of FIG. 8 executing machine executable instructions such as those implemented by at least block 512 of FIG. 5. In some examples, the multi-account adjustment factor generation circuitry 204 may be instantiated by hardware logic circuitry, which may be implemented by an ASIC, XPU, or the FPGA circuitry 900 of FIG. 9 structured to perform operations corresponding to the machine readable instructions. Additionally or alternatively, the multi-account adjustment factor generation circuitry 204 may be instantiated by any other combination of hardware, software, and/or firmware. For example, the multi-account adjustment factor generation circuitry 204 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the adjustment factor analyzer 134 includes means for generating an account sharing adjustment vector. For example, the means for generating an account sharing adjustment vector may be implemented by the account sharing adjustment factor generation circuitry 206. In some examples, the account sharing adjustment factor generation circuitry 206 may be instantiated by processor circuitry such as the example processor circuitry 712 of FIG. 7. For instance, the account sharing adjustment factor generation circuitry 206 may be instantiated by the example microprocessor 800 of FIG. 8 executing machine executable instructions such as those implemented by at least blocks 514 and 516 of FIG. 5. In some examples, the account sharing adjustment factor generation circuitry 206 may be instantiated by hardware logic circuitry, which may be implemented by an ASIC, XPU, or the FPGA circuitry 900 of FIG. 9 structured to perform operations corresponding to the machine readable instructions. Additionally or alternatively, the account sharing adjustment factor generation circuitry 206 may be instantiated by any other combination of hardware, software, and/or firmware. For example, the account sharing adjustment factor generation circuitry 206 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the adjustment factor analyzer 134 includes means for generating a non-coverage adjustment vector. For example, the means for generating a non-coverage adjustment vector may be implemented by the non-coverage adjustment factor generation circuitry 208. In some examples, the non-coverage adjustment factor generation circuitry 208 may be instantiated by processor circuitry such as the example processor circuitry 712 of FIG. 7. For instance, the non-coverage adjustment factor generation circuitry 208 may be instantiated by the example microprocessor 800 of FIG. 8 executing machine executable instructions such as those implemented by at least block 518 of FIG. 5. In some examples, the non-coverage adjustment factor generation circuitry 208 may be instantiated by hardware logic circuitry, which may be implemented by an ASIC, XPU, or the FPGA circuitry 900 of FIG. 9 structured to perform operations corresponding to the machine readable instructions. Additionally or alternatively, the non-coverage adjustment factor generation circuitry 208 may be instantiated by any other combination of hardware, software, and/or firmware. For example, the non-coverage adjustment factor generation circuitry 208 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the adjustment factor analyzer 134 includes means for generating a co-viewing adjustment vector. For example, the means for generating a co-viewing adjustment vector may be implemented by the co-viewing adjustment factor generation circuitry 210. In some examples, the co-viewing adjustment factor generation circuitry 210 may be instantiated by processor circuitry such as the example processor circuitry 712 of FIG. 7. For instance, the co-viewing adjustment factor generation circuitry 210 may be instantiated by the example microprocessor 800 of FIG. 8 executing machine executable instructions such as those implemented by at least blocks 520 and 522 of FIG. 5. In some examples, the co-viewing adjustment factor generation circuitry 210 may be instantiated by hardware logic circuitry, which may be implemented by an ASIC, XPU, or the FPGA circuitry 900 of FIG. 9 structured to perform operations corresponding to the machine readable instructions. Additionally or alternatively, the co-viewing adjustment factor generation circuitry 210 may be instantiated by any other combination of hardware, software, and/or firmware. For example, the co-viewing adjustment factor generation circuitry 210 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

Figure 3:
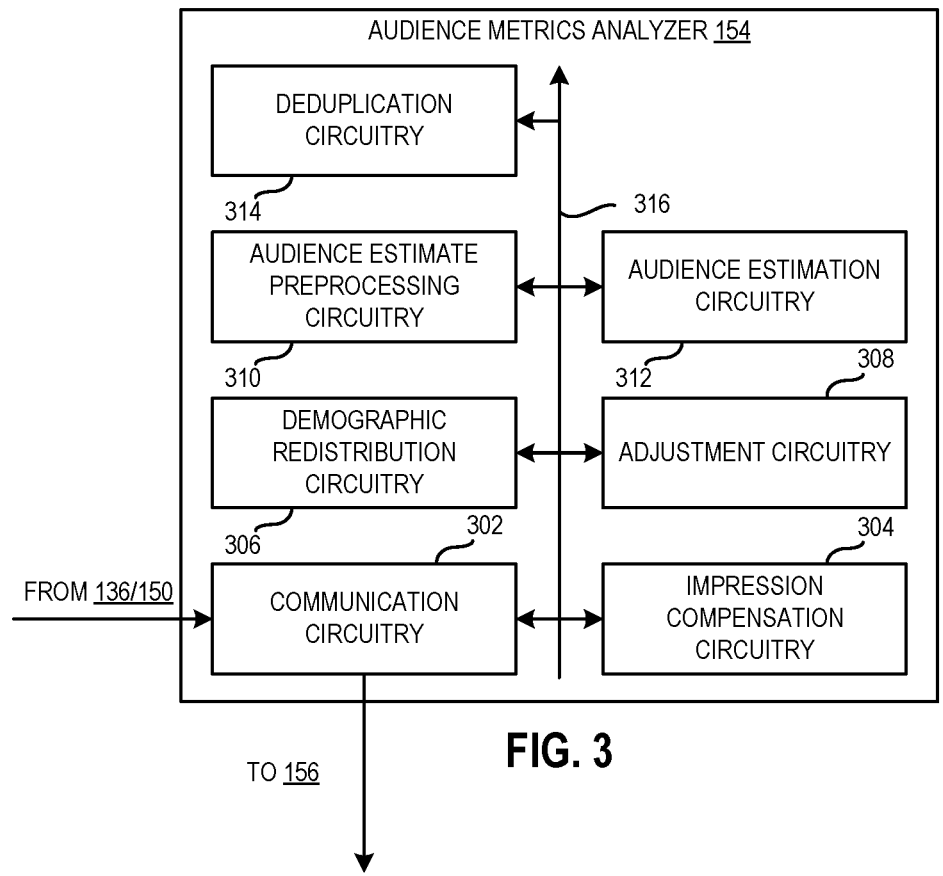
FIG. 3 is a block diagram of an example implementation of the example audience metrics analyzer of FIG. 1.

FIG. 3 is a block diagram of an example implementation of the example audience metrics analyzer 154 of FIG. 1. In the example of FIG. 3, the audience metrics analyzer 154 includes example communication circuitry 302, example impression compensation circuitry 304, example demographic redistribution circuitry 306, example adjustment circuitry 308, example audience estimate preprocessing circuitry 310, example audience estimation circuitry 312, and example deduplication circuitry 314. In the example of FIG. 3, any of the communication circuitry 302, the impression compensation circuitry 304, the demographic redistribution circuitry 306, the adjustment circuitry 308, the audience estimate preprocessing circuitry 310, the audience estimation circuitry 312, and/or the deduplication circuitry 314 can communicate via an example communication bus 316.

In the illustrated example of FIG. 3, the audience metrics analyzer 154 of FIG. 3 may be instantiated (e.g., creating an instance of, bring into being for any length of time, materialize, implement, etc.) by processor circuitry such as a central processing unit executing instructions. Additionally or alternatively, the audience metrics analyzer 154 of FIG. 3 may be instantiated (e.g., creating an instance of, bring into being for any length of time, materialize, implement, etc.) by an ASIC or an FPGA structured to perform operations corresponding to the instructions. It should be understood that some or all of the circuitry of FIG. 3 may, thus, be instantiated at the same or different times. Some or all of the circuitry may be instantiated, for example, in one or more threads executing concurrently on hardware and/or in series on hardware. Moreover, in some examples, some or all of the circuitry of FIG. 3 may be implemented by microprocessor circuitry executing instructions to implement one or more virtual machines and/or containers.

In the illustrated example of FIG. 3, the communication circuitry 302 accesses data in the adjustment factors database 136 and/or the aggregated campaign data database 150. In some examples, data stored in the adjustment factors database 136 and/or the aggregated campaign data database 150 is clustered. For example, data, representative of impressions and/or other metrics, in the aggregated campaign data database 150 is clustered by a combination and/or permutation of the genre of media to which the impressions correspond, daypart (e.g., time of day) during which the media was requested, and device data of the device that requested the media. Similarly, data, representative of one or more adjustment factor vectors and/or matrices, stored in the adjustment factor database 136 is clustered by a combination and/or permutation of the genre of media to which the adjustment factors correspond, daypart (e.g., time of day) during which the media was requested, and device data of the device that requested the media. Additionally, clusters may be distinguished based the inventory type (e.g., YouTube Main or YouTube TV) from which the impressions were generated (for the aggregated campaign data) and/or from which the media was requested (for the adjustment factors). Clusters may be subdivided into different demographics reported for the impressions and/or into different demographics to which adjustment factors correspond. In some examples, the communication circuitry 302 is instantiated by processor circuitry executing communication instructions and/or configured to perform operations such as those represented by the flowchart of FIG. 6.

In the illustrated example of FIG. 3, the impression compensation circuitry 304 corrects for one or more impressions that are not reported by the database proprietor 102 in the aggregated campaign data stored in the aggregated campaign data database 150. As described above, the privacy constraints imposed on the data within the privacy-protected cloud environment 106 include a limitation that data cannot be extracted (even when aggregated) for less than a threshold number of individuals (e.g., 50 individuals). Accordingly, if impressions for a particular demographic subdivision include less than the threshold number, the data aggregator 148 will not provide such data to be stored in the aggregated campaign data database 150. Accordingly, the omission of such data can create logic inconsistencies in the aggregated campaign data.

As such, in the illustrated example of FIG. 3, the impression compensation circuitry 304 compensates for missing impressions in an impression dataset (e.g., the aggregated campaign data) provided by the database proprietor 102 where the impression dataset is associated with media (e.g., an advertising campaign, an episode of a television show, etc.). To compensate for missing impressions, the impression compensation circuitry 304 determines the total number of impressions associated with the media as reported by the database proprietor 102. The impression compensation circuitry 304 subdivides (e.g., groups) the total number of reported impressions by inventory type (e.g., one group for impressions reported for YouTube Main, one group for impressions reported for YouTube TV, etc.). Within each inventory type subdivision, the impression compensation circuitry 304 subdivides (e.g., groups) the impressions by cluster.

In the illustrated example of FIG. 3, the impression compensation circuitry 304 then sums the number of impressions in each cluster to determine a summed number of impressions for the inventory type (e.g., YouTube Main). The impression compensation circuitry 304 compares the summed number of impressions for the inventory type to the total number of reported impressions for that inventory type (e.g., the group for impressions reported for YouTube Main). If the summed number is equal to (or within a threshold of) the total number reported for that inventory type, the data is logically consistent, and processing may proceed without compensating for missing impressions. However, if the summed number is not equal to (or not within a threshold of) the total number reported for that inventory type, the data is logically inconsistent and the impression compensation circuitry 304 performs compensation.

In the illustrated example of FIG. 3, for each logically inconsistent inventory type, the impression compensation circuitry 304 determines a difference between the total number of impressions reported for that inventory type and the summed number of impressions for the inventory type (e.g., the number of missing impressions for the inventory type). The impression compensation circuitry 304 determines the percentage contributions of each cluster of the inventory type to the summed number of impressions for the inventory type (e.g., the number of impressions for that cluster of the inventory type divided by the summed number of impressions for the inventory type). The impression compensation circuitry 304 multiplies the percentage contributions by the number of missing impressions for the inventory type to estimate a number of impressions missing from the corresponding clusters and adds the estimated number of missing impressions to the number of impressions reported for that cluster of the inventory type.

In the illustrated example of FIG. 3, the data represented in the impressions dataset may be subdivided by demographics reported for a cluster. In some examples, due to the privacy restrictions some of the demographic subdivisions may not be associated with any impressions and/or a unique audience size for those demographic subdivisions. In such examples, per cluster, the impression compensation circuitry 304 imputes impressions and unique audience size for demographics in the impression dataset for which no impressions were reported by the database proprietor 102. To impute impressions and unique audience size, the impression compensation circuitry 304 processes the impression dataset on a per cluster basis.

In the illustrated example of FIG. 3, for each cluster, the impression compensation circuitry 304 determines the number of impressions per demographic subdivision as reported by the database proprietor 102. Additionally, for each cluster, the impression compensation circuitry 304 determines the total number of impressions for the corresponding cluster as reported by the database proprietor 102. Using maximum entropy and based on the total number of impressions reported for the cluster and the number of impressions per demographic subdivision of the cluster, the impression compensation circuitry 304 imputes a number of impressions for the demographic subdivisions of the cluster for which no value was reported.

In the illustrated example of FIG. 3, the impression compensation circuitry 304 determines a total number of impressions for the media with which the impression dataset is associated and a total unique audience size for the media as reported by the database proprietor 102 (e.g., in the aggregated campaign data). The impression compensation circuitry 304 computes an overall frequency for the media based on the total number of impressions for the media and the reported total unique audience size for the media. For example, to compute the overall frequency for the media, the impression compensation circuitry 304 divides the total number of impressions for the media by the reported total unique audience size for the media. To impute a unique audience size for each demographic subdivision for which no data was reported by the database proprietor 102, the impression compensation circuitry 304 multiplies the imputed impressions for the demographic subdivisions by the overall frequency for the media. In some examples, the impression compensation circuitry 304 is instantiated by processor circuitry executing impression compensation instructions and/or configured to perform operations such as those represented by the flowchart of FIG. 6.

In the illustrated example of FIG. 3, the demographic redistribution circuitry 306 performs demographic redistribution of impressions in the impression dataset for which no demographics were reported. For example, impressions represented in the impression dataset may be associated with no demographic subdivision (e.g., totally unknown demographics) or a limited demographic subdivision (e.g., the impression is associated with an older person (e.g., above 35), but no information is known about the gender of the person). In such examples, the demographic redistribution circuitry 306 redistributes these impressions to demographics subdivisions of the impression dataset. For a category of demographics of a cluster having impressions for which no demographic subdivision is known, the demographic redistribution circuitry 306 computes a percentage contribution of the impressions having a known subdivision to the total number of impressions reported for that subdivision of demographics. For example, if the demographic subdivision of old people includes categories for old males and old females and no data is reported for the number of impressions corresponding to old females, the demographic redistribution circuitry 306 computes the percentage contribution of impressions corresponding to old males to the total number of impressions reported for old people.

In the illustrated example of FIG. 3, the demographic redistribution circuitry 306 multiplies the number of impression for which the demographic subdivision is unknown by the percentage contribution of each category of the demographic subdivision to determine a number of the unknown demographic impressions that correspond to each category of the demographic subdivision. The demographic redistribution circuitry 306 combines (e.g., adds) the number of the unknown demographic impressions corresponding to a category of the demographic subdivision to the reported number of impressions for that demographic subdivision. In some examples, the demographic redistribution circuitry 306 is instantiated by processor circuitry executing demographic redistribution instructions and/or configured to perform operations such as those represented by the flowchart of FIG. 6.

In some examples, after the demographic redistribution circuitry 306 redistributes impressions for which no demographics are known, the impression compensation circuitry 304 verifies that impressions for each demographic subdivision of a cluster are logically consistent with the overall impressions for the cluster. For example, the impression compensation circuitry 304 sums the demographic redistributed impressions (e.g., the number of impressions per demographic subdivision after processing by the demographic redistribution circuitry 306) for all demographic subdivisions of a cluster. The impression compensation circuitry 304 compares the summed demographic redistribute impressions for the cluster to the total number of impressions reported for the cluster. If the summed demographic redistribute impressions are equal to (or within a threshold of) the total number of impressions reported for the cluster, the data is logically consistent and processing may proceed without recompensating for missing impressions and redistributing unknown impressions among demographics. However, if the summed demographic redistribute impressions are not equal to (or within a threshold of) the total number of impressions reported for the cluster, the data is logically inconsistent and the impression compensation circuitry 304 recompensates for missing impressions and the demographic redistribution circuitry 306 redistributes unknown impressions among demographics.

In the illustrated example of FIG. 3, the adjustment circuitry 308 applies adjustment factors to impression data reported in the impression dataset. As described above, data in the impression dataset may be clustered. For each cluster, the data may be represented by a 1×24 vector including columns corresponding to different demographic subdivisions of the cluster. Each element of the 1×24 vector corresponds to the count of impressions of media reported for that demographic subdivision (e.g., corresponding to the respective demographics). In examples disclosed herein, the 1×24 vector is referred to as a demographic impressions vector.

In the illustrated example of FIG. 3, per cluster, the adjustment circuitry 308 adjusts a demographic impressions vector based on a multi-account adjustment vector for the cluster. For example, the adjustment circuitry 308 performs matrix multiplication between the demographic impressions vector and the multi-account adjustment vector. Additionally, per cluster, the adjustment circuitry 308 adjusts the demographic impressions vector based on an account sharing adjustment matrix for the cluster. As described above, the account sharing adjustment matrix for a cluster includes probabilities that a user account has first values for demographics (e.g., as reported by the database proprietor 102) if a matching panelist has second values for the demographics. In the example of FIG. 3, account sharing adjustment matrices are represented by 24×24 matrices. As a particular user account may have multiple potential demographics associated therewith, before a demographic impressions vector is extracted from the aggregated campaign data, one group of demographics is selected (e.g., randomly) for the user account and subsequently the demographic impressions vector(s) are generated.

In the illustrated example of FIG. 3, per cluster, the adjustment circuitry 308 adjusts the demographic impressions vector based on a non-coverage adjustment vector for the cluster. For example, the adjustment circuitry 308 performs matrix multiplication between the demographic impressions vector and the non-coverage adjustment vector. Additionally, per cluster, the adjustment circuitry 308 scales the demographic impressions vector to ensure logical consistency with the total number of impressions for the cluster as reported by the database proprietor 102. For example, when adjusting the demographic impressions vector for a cluster with the multi-account adjustment vector, the account sharing adjustment matrix, and the non-coverage adjustment vector values of the resultant demographic impressions vector may be rounded to a whole number (e.g., because impressions are typically whole numbers and may not be fractional). This rounding can cause logical inconsistencies in the data.

In the illustrated example of FIG. 3, the adjustment circuitry 308 scales the demographics impressions vector to ensure that the demographic impressions vector is logically consistent with the total number of impressions for the cluster, as reported by the database proprietor 102. Per cluster, the adjustment circuitry 308 adjusts the demographic impressions vector based on a co-viewing adjustment vector for the cluster. In some examples, the adjustment circuitry 308 is instantiated by processor circuitry executing adjustment instructions and/or configured to perform operations such as those represented by the flowchart of FIG. 6.

In the illustrated example of FIG. 3, the audience estimate preprocessing circuitry 310 preprocesses demographic impressions vectors before impressions dataset is input to the audience estimation circuitry 312. For example, the audience estimation circuitry 312 computes unique audience size metrics for different hierarchical levels of a media campaign represented by the impression dataset. For example, unique audience size may be reported at the level of audience size per individual media placement per inventory type, at the level of audience size per individual media placement across all inventory types, at the level of audience size per site per inventory type, at the level of audience size per site across all inventory types, at the level of audience size per media campaign per inventory type, and/or at the level of audience size per media campaign across all inventory types.

In the illustrated example of FIG. 3, the audience estimate preprocessing circuitry 310 performs roll-up for each hierarchical level of the impression dataset. To perform roll-up for a hierarchical level of the impression dataset, the audience estimate preprocessing circuitry 310 generates a composite demographic impressions vector that includes the sum of the total number of impressions for each demographic subdivision for that level of the hierarchy. Additionally, the audience estimate preprocessing circuitry 310 prepares the one or more composite demographic impressions vectors for unique audience estimation by determining a unique audience size for each composite demographic impressions vector (e.g., as reported by the database proprietor 102). In some examples, the audience estimate preprocessing circuitry 310 determines a unique audience size for each composite demographic impressions vector on a per inventory type basis. In some examples, the audience estimate preprocessing circuitry 310 is instantiated by processor circuitry executing audience estimate preprocessing instructions and/or configured to perform operations such as those represented by the flowchart of FIG. 6.

In the illustrated example of FIG. 3, the audience estimation circuitry 312 determines a unique audience size for the media at a designated hierarchical level (e.g., as specified by a client of the AME 104) and by inventory type at the designated hierarchical level. For example, audience estimation circuitry 312 determines an example weight set that, when multiplied by a total number of impressions per demographic as reported in the AME panel data for panelists matching user accounts of the database proprietor 102 and summed together, causes the summed products to be equal to (or within a threshold of) the total number of impressions per demographic for the media after processing by the adjustment circuitry 308. Additionally, the audience estimation circuitry 312 determines the weight set such that, when the sum of the product of the weight set and the unique audience size per demographic for user accounts matching panelists is equal to (or within a threshold of) the unique audience size per demographic for the media as reported by the database proprietor 102.

In the illustrated example of FIG. 3, the audience estimation circuitry 312 determines the example weight set by finding the minimum variance of weights subject to three constraints. The first constraint is that the sum of the products of the weights and the total number of impressions per demographic as reported in the AME panel data for panelists matching user accounts of the database proprietor 102 be equal to (or within a threshold of) the total number of impressions per demographic for the media after processing by the adjustment circuitry 308 (e.g., post scaling and adjustment for co-viewing). The second constraint is that the sum of the products of the weights and the unique audience size per demographic for user accounts matching panelists be equal to (or within a threshold of) the unique audience size per demographic for the media as reported by the database proprietor 102. The third constraint is that the weights be greater than or equal to zero.

In the illustrated example of FIG. 3, after determining an example weight set, the audience estimation circuitry 312 applies the weight set to a unique audience size per demographic for the media as determined based on the AME panel data. For example, the unique audience size per demographic for the media is based on all panelists of the AME 104 that indicated that they viewed and/or were exposed to the media. To apply the weight set to the unique audience size per demographic, the audience estimation circuitry 312 multiplies the unique audience size per demographic by the weight set. An example methodology to estimate unique audience size as described above is described in Sheppard et al., U.S. Pat. No. 10,339,543, which is hereby incorporated herein by reference in its entirety. In some examples, the audience estimation circuitry 312 is instantiated by processor circuitry executing audience estimation instructions and/or configured to perform operations such as those represented by the flowchart of FIG. 6.

In the illustrated example of FIG. 3, the deduplication circuitry 314 removes duplicate values from the unique audience estimate that are cause by persons being exposed to the media via different inventory types. In the example of FIG. 3, the deduplication circuitry 314 applies Frechet ratio deduplication to remove repeat audience members across YouTube Main and YouTube TV. For example, the deduplication circuitry 314 finds a ratio (e.g., a Frechet ratio) indicative of the overlap between the unique audience size determined for YouTube Main and the unique audience size determined for YouTube TV. In some examples, the deduplication circuitry 314 computes the Frechet ratio based on ratings and reach data collected and/or determined based on the AME panel data. In some examples, the deduplication circuitry 314 is instantiated by processor circuitry executing deduplication instructions and/or configured to perform operations such as those represented by the flowchart of FIG. 6.

In some examples, the audience metrics analyzer 154 includes means for communicating. For example, the means for communicating may be implemented by the communication circuitry 302. In some examples, the communication circuitry 302 may be instantiated by processor circuitry such as the example processor circuitry 712 of FIG. 7. For instance, the communication circuitry 302 may be instantiated by the example microprocessor 800 of FIG. 8 executing machine executable instructions such as those implemented by at least block 630 of FIG. 6. In some examples, the communication circuitry 302 may be instantiated by hardware logic circuitry, which may be implemented by an ASIC, XPU, or the FPGA circuitry 900 of FIG. 9 structured to perform operations corresponding to the machine readable instructions. Additionally or alternatively, the communication circuitry 302 may be instantiated by any other combination of hardware, software, and/or firmware. For example, the communication circuitry 302 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the audience metrics analyzer 154 includes means for compensating. For example, the means for compensating may be implemented by the impression compensation circuitry 304. In some examples, the impression compensation circuitry 304 may be instantiated by processor circuitry such as the example processor circuitry 712 of FIG. 7. For instance, the impression compensation circuitry 304 may be instantiated by the example microprocessor 800 of FIG. 8 executing machine executable instructions such as those implemented by at least blocks 602, 604, and 608 of FIG. 6. In some examples, the impression compensation circuitry 304 may be instantiated by hardware logic circuitry, which may be implemented by an ASIC, XPU, or the FPGA circuitry 900 of FIG. 9 structured to perform operations corresponding to the machine readable instructions. Additionally or alternatively, the impression compensation circuitry 304 may be instantiated by any other combination of hardware, software, and/or firmware. For example, the impression compensation circuitry 304 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the audience metrics analyzer 154 includes means for redistributing. For example, the means for redistributing may be implemented by the demographic redistribution circuitry 306. In some examples, the demographic redistribution circuitry 306 may be instantiated by processor circuitry such as the example processor circuitry 712 of FIG. 7. For instance, the demographic redistribution circuitry 306 may be instantiated by the example microprocessor 800 of FIG. 8 executing machine executable instructions such as those implemented by at least block 606 of FIG. 6. In some examples, the demographic redistribution circuitry 306 may be instantiated by hardware logic circuitry, which may be implemented by an ASIC, XPU, or the FPGA circuitry 900 of FIG. 9 structured to perform operations corresponding to the machine readable instructions. Additionally or alternatively, the demographic redistribution circuitry 306 may be instantiated by any other combination of hardware, software, and/or firmware. For example, the demographic redistribution circuitry 306 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the audience metrics analyzer 154 includes means for adjusting. For example, the means for adjusting may be implemented by the adjustment circuitry 308. In some examples, the adjustment circuitry 308 may be instantiated by processor circuitry such as the example processor circuitry 712 of FIG. 7. For instance, the adjustment circuitry 308 may be instantiated by the example microprocessor 800 of FIG. 8 executing machine executable instructions such as those implemented by at least blocks 610, 612, 614, 616, and 618 of FIG. 6. In some examples, the adjustment circuitry 308 may be instantiated by hardware logic circuitry, which may be implemented by an ASIC, XPU, or the FPGA circuitry 900 of FIG. 9 structured to perform operations corresponding to the machine readable instructions. Additionally or alternatively, the adjustment circuitry 308 may be instantiated by any other combination of hardware, software, and/or firmware. For example, the adjustment circuitry 308 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the audience metrics analyzer 154 includes means for preprocessing. For example, the means for preprocessing may be implemented by the audience estimate preprocessing circuitry 310. In some examples, the audience estimate preprocessing circuitry 310 may be instantiated by processor circuitry such as the example processor circuitry 712 of FIG. 7. For instance, the audience estimate preprocessing circuitry 310 may be instantiated by the example microprocessor 800 of FIG. 8 executing machine executable instructions such as those implemented by at least blocks 620 and 622 of FIG. 6. In some examples, the audience estimate preprocessing circuitry 310 may be instantiated by hardware logic circuitry, which may be implemented by an ASIC, XPU, or the FPGA circuitry 900 of FIG. 9 structured to perform operations corresponding to the machine readable instructions. Additionally or alternatively, the audience estimate preprocessing circuitry 310 may be instantiated by any other combination of hardware, software, and/or firmware. For example, the audience estimate preprocessing circuitry 310 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the audience metrics analyzer 154 includes means for estimating. For example, the means for estimating may be implemented by the audience estimation circuitry 312. In some examples, the audience estimation circuitry 312 may be instantiated by processor circuitry such as the example processor circuitry 712 of FIG. 7. For instance, the audience estimation circuitry 312 may be instantiated by the example microprocessor 800 of FIG. 8 executing machine executable instructions such as those implemented by at least blocks 624 and 626 of FIG. 6. In some examples, the audience estimation circuitry 312 may be instantiated by hardware logic circuitry, which may be implemented by an ASIC, XPU, or the FPGA circuitry 900 of FIG. 9 structured to perform operations corresponding to the machine readable instructions. Additionally or alternatively, the audience estimation circuitry 312 may be instantiated by any other combination of hardware, software, and/or firmware. For example, the audience estimation circuitry 312 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the audience metrics analyzer 154 includes means for deduplicating. For example, the means for deduplicating may be implemented by the deduplication circuitry 314. In some examples, the deduplication circuitry 314 may be instantiated by processor circuitry such as the example processor circuitry 712 of FIG. 7. For instance, the deduplication circuitry 314 may be instantiated by the example microprocessor 800 of FIG. 8 executing machine executable instructions such as those implemented by at least block 628 of FIG. 6. In some examples, the deduplication circuitry 314 may be instantiated by hardware logic circuitry, which may be implemented by an ASIC, XPU, or the FPGA circuitry 900 of FIG. 9 structured to perform operations corresponding to the machine readable instructions. Additionally or alternatively, the deduplication circuitry 314 may be instantiated by any other combination of hardware, software, and/or firmware. For example, the deduplication circuitry 314 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

Figure 4A:
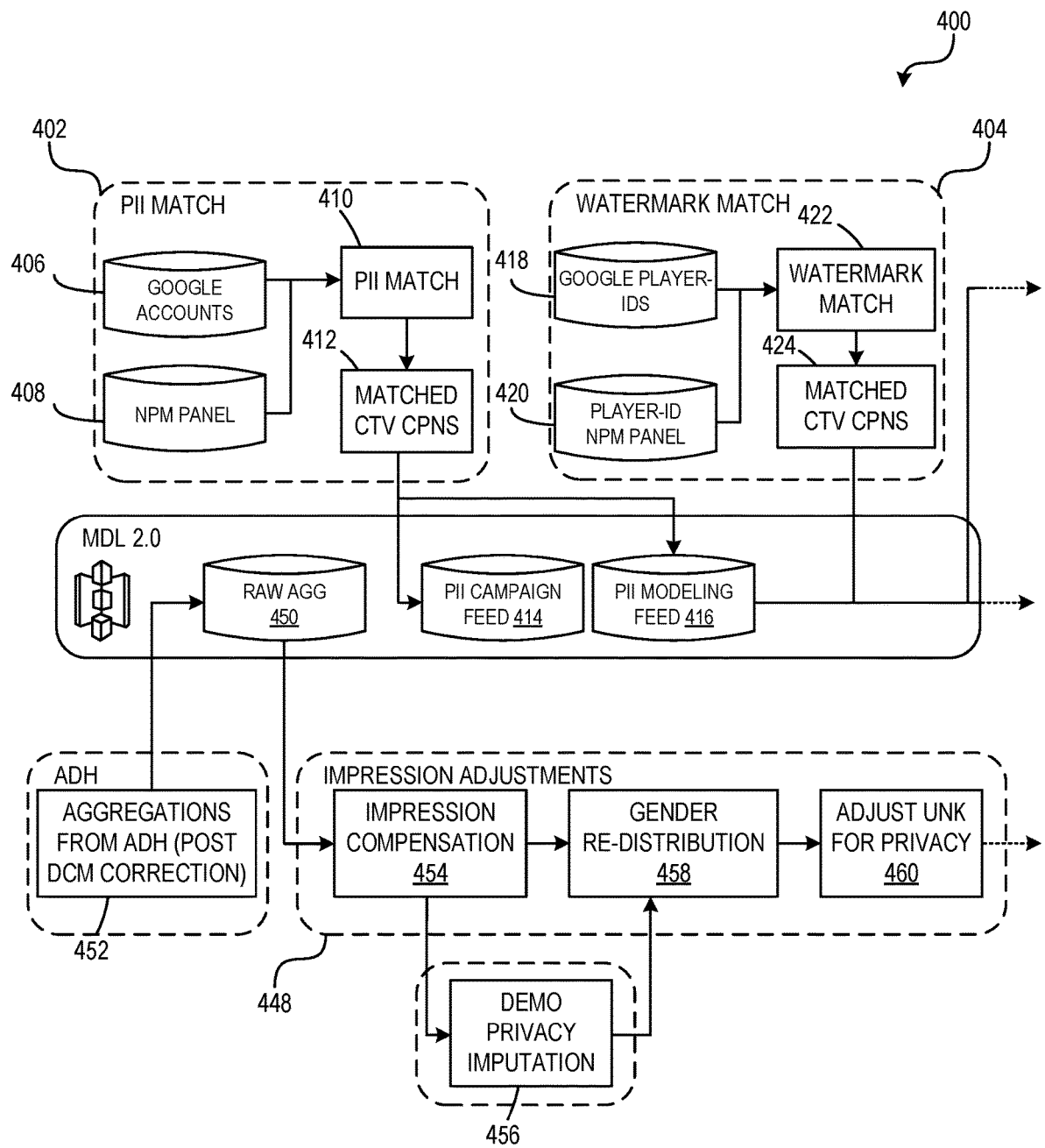
FIGS. 4A and 4B illustrate an example process flow in accordance with examples disclosed herein.
Figure 4B:
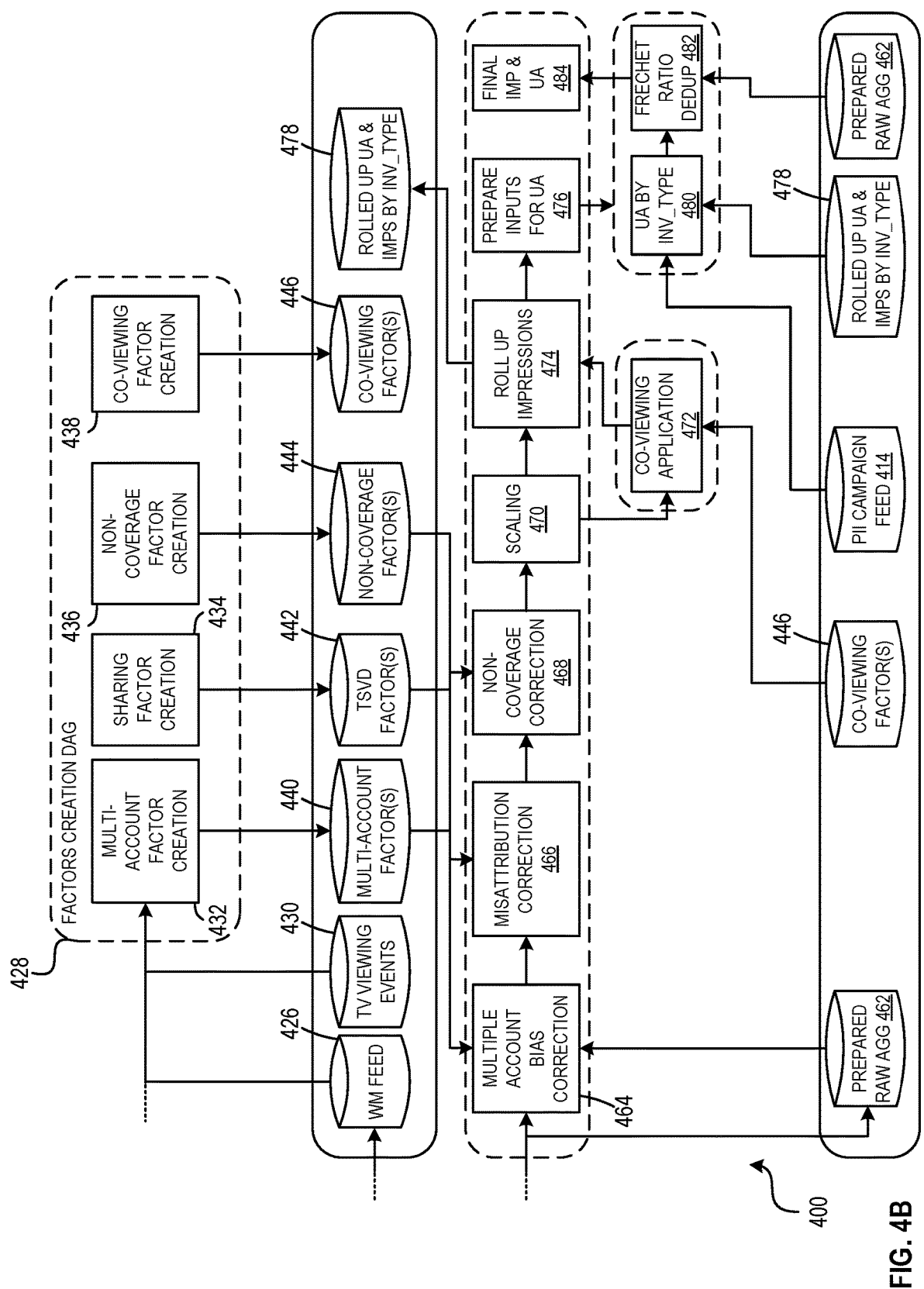

FIGS. 4A and 4B illustrate an example process flow 400 in accordance with examples disclosed herein. FIGS. 4A and 4B, collectively FIG. 4, illustrate an example implementation of FIG. 1 where the database proprietor 102 corresponds to Google. The process flow 400 includes subprocesses such as an example first subprocess 402 and an example second subprocess 404.

In the illustrated example of FIG. 4, the data matching analyzer 128 executes and/or instantiates the first subprocess 402 to perform example PII matching between example PII information 406 associated with Google accounts and example PII information 408 associated with an example national people meter (NPM) panel. For example, the PII information 406 associated with Google accounts corresponds to the matchable impression database 118. In such an example, the PII information 406 corresponds to user-based covariate, such as the names, ages, and/or genders of registered users (and/or any other demographic information about the registered users) collected at the time the registered users registered with the database proprietor 102, and/or the relative frequency with which the registered users use the different types of client device 110, the number of media items the registered users have accessed during a most recent period of time (e.g., the last 30 days), the search terms entered by the registered users during a most recent period of time (e.g., the last 30 days), feature embeddings (numerical representations) of classifications (e.g., genres) of videos viewed and/or searches entered by the registered users, etc.

In the illustrated example of FIG. 4, the PII information 408 associated with the example NPM panel corresponds to, for example, the AME panel data database 122. In such an example, the PII information 408 corresponds to demographic information such as age, gender, race, ethnicity, education, employment status, income level, geographic location of residence, etc. In the example of FIG. 4, the data matching analyzer 128 executes and/or instantiates the first subprocess 402 to perform an example PII match operation 410 and example extraction operation 412.

In the illustrated example of FIG. 4, at the PII match operation 410, the data matching analyzer 128 searches the PII information 406 associated with Google accounts and the PII information 408 associated with the NPM panel for matching PII information. In other words, the data matching analyzer 128 searches the PII information 406 associated with Google accounts for one or more Google accounts that match one or more panelists represented in the PII information 408 associated with the NPM panel.

In the illustrated example of FIG. 4, after determining a Google account that matches a panelist, the data matching analyzer 128 executes and/or instantiates the example extraction operation 412. For example, at the extraction operation 412, the data matching analyzer 128 extracts CPNs for the matching Google account(s) and stores (e.g., is to cause storage of) the CPNs in an example PII campaign feed database 414 and/or an example PII modeling feed database 416. For example, the extracted CPNs stored in the PII campaign feed database 414 and the PII modeling feed database 416 correspond to CPNs associated with a Google account that was logged into a CTV and/or OTT device. The extracted CPNs stored in the PII campaign feed database 414 correspond to a media campaign of a client of the AME 104. Additionally or alternatively, the extracted CPNs stored in the PII modeling feed database 416 correspond to all reported CPNs associated with the Google account that was logged into a CTV and/or OTT device.

In the illustrated example of FIG. 4, at the second subprocess 404, the data matching analyzer 128 performs example watermark matching between example player identifiers (IDs) 418 associated with Google accounts and example player IDs 420 associated with the NPM panel. At the example second subprocess 404, the data matching analyzer 128 determines impressions and/or demographic information for audience members who view content when not logged into a Google account and/or when viewing media on a non-OTT device. For example, when an audience member utilizes an application (e.g., YouTube Main and/or YouTube TV) on a device, media presented via the device may trigger a watermark ping on the device. In such an example, the meter 115 detects the watermark ping and a player ID associated therewith. In this manner, various meters deployed to panelist households detect respective player IDs to form the player IDs 420 associated with the NPM panel.

In examples disclosed herein, a watermark ping will cause the browser and/or application to send a request (sometimes referred to herein as a "beacon request") to a data collection facility such as a server that is associated with the AME 104. In some examples, the beacon request is an HTTP request (e.g., an HTTP GET request, an HTTP POST request, etc.). The beacon request enables monitoring data reflecting information about the media access to be tracked. To this end, the beacon request carries identification information to be collected, compiled and/or analyzed at the AME server. The identification information may include a user agent string to identify the user device on which the media is requested, a media identifier to identify the media with which the watermark ping is associated (e.g., a website address), a host identifier to identify the host (e.g., web server) with which the requested media is associated (e.g., a vendor identifier (VID)), a time stamp to identify the dates/times at which the media is requested, accessed and/or received, one or more command identifiers identifying control commands (e.g., pause, play, stop, etc.) acted upon the media, etc.

In the illustrated example of FIG. 4, the second subprocess 404 includes an example watermark match operation 422 and an example extraction operation 424. For example, at the watermark match operation 422, the data matching analyzer 128 searches the player IDs 418 associated with Google accounts for matches to the player IDs 420 associated with the NPM panel. In the example of FIG. 4, after determining a player ID associated with a Google account that matches a player ID of a panelist, the data matching analyzer 128 implements the extraction operation 424 to extract CPNs for the matching Google account(s) and stores (e.g., is to cause storage of) the CPNs in an example watermark (WM) feed database 426. For example, the extracted CPNs may correspond to CPNs associated with a Google account that was logged into a CTV and/or OTT device. In some examples, the WM feed database 426 may be implemented by two databases in a manner similar to the PII campaign feed database 414 and the PII modeling feed database 416. Additionally or alternatively, the PII campaign feed database 414 and the PII modeling feed database 416 may be implemented by one database.

In the illustrated example of FIG. 4, a detected watermark ping allows the AME 104 to collect CPNs from matching Google accounts for a period of time. For example, for a detected watermark ping associated with media presented via YouTube Main, the AME 104 collects CPNs for the next seven days after the initial watermark ping. Additionally or alternatively, for a detected watermark ping associated with media presented via YouTube TV, the AME 104 collects CPNs for the next eleven days after the initial watermark ping.

In some examples, the PII campaign feed database 414, the PII modeling feed database 416, and/or the WM feed database 426 may be represented in one database. In such examples, processor circuitry may combine t the PII campaign feed database 414, the PII modeling feed database 416, and/or the WM feed database 426 such that the resulting data identifies panelists and/or Google accounts that were exposed to media, what media was presented, and at what times the media was presented. The resulting data also identifies the genre of the media during which an ad was served, the daypart during which the ad was placed, and the device on which the ad was served.

Example processor circuitry disclosed herein forms one or more clusters based on the combined the PII campaign feed database 414, the PII modeling feed database 416, and/or the WM feed database 426. For example, each category of the combined the PII campaign feed database 414, the PII modeling feed database 416, and/or the WM feed database 426 includes certain inherent information that can provide insight as to the co-viewing of media associated with that category. However, it may be the case that no individual category includes enough information to allow machine learning models to perform with enough accuracy.

Advantageously, example processor circuitry disclosed herein forms one or more clusters based on a combination and/or permutation of the genre, daypart, and device data. An example cluster includes data for do it yourself (DIY) blogs, presented in the morning, via a Roku Streaming Stick. Example clusters disclosed herein were formed based on analysis of the permutations and combinations of empirical data that allowed for the most accuracy of a machine learning model and the largest sample size of data. Example clusters are illustrated in FIG. 11.

FIG. 11 illustrates an example cluster table 1100. The example cluster table 1100 includes an example cluster inventory type column 1102 that indicates the inventory type (e.g., YouTube Main or YouTube TV) to which a cluster corresponds. The example cluster table 1100 includes an example cluster ID column 1104 that indicates the combination and/or permutation of the genre, daypart (e.g., time of day), and device data of the device for a cluster. The cluster table 1100 also includes an example cluster genre ID column 1106 and an example cluster genre column 1108. The example cluster genre column 1106 indicates the genre of a cluster and the cluster genre ID column 1108 indicates a numerical representation of the genre. Example genres include (1) arts and entertainment; (2) automobile; (3) beauty and fitness; (4) food and travel; (5) gaming; (6) home and garden; (7) hobbies and leisure; (8) internet and telecommunication; (9) jobs and education; (10) news, business, finance, real estate, and law; (11) other; (12) pets; (13) shopping; (14) sports; and (15) all. Many other genres are possible.

In the illustrated example of FIG. 11, the cluster table 1100 also includes an example daypart column 1110. The example daypart column 1110 indicates the daypart of a cluster. FIG. 11 illustrates clusters including all dayparts.

Example dayparts include (1) non-primetime, (2) post-primetime, (3) pre-primetime, (4) primetime, and (5) all. Many other dayparts are possible. Additionally, the cluster table 1100 includes an example device column 1112. The example device column 1112 indicates the device of a cluster. FIG. 11 illustrates clusters including all devices. Example devices include (1) Apple devices, (2) digital versatile disk (DVD) players, (3) gaming devices, (4) Google devices, (5) Roku devices, (6) Amazon devices, (7) set top boxes, (8) STV players, (9) unknown devices, and (10) all devices. Many other devices are possible.

Returning to FIG. 4, the process flow 400 includes an example third subprocess 428. In the example of FIG. 4, the third subprocess 428 corresponds to a factors creation directed acyclic graph (DAG) that is executed and/or instantiated by the adjustment factor analyzer 134. In the third subprocess 428, the adjustment factor analyzer 134 processes the clustered data from the PII campaign feed database 414, the PII modeling feed database 416, the WM feed database 426, and/or an example TV viewing events database 430 to generate one or more adjustment factors such as one or more multi-account adjustment vectors 432, one or more sharing factor adjustment matrices 434, one or more non-coverage adjustment vectors 436, and/or one or more co-viewing adjustment vectors 438.

In the illustrated example of FIG. 4, the adjustment factor analyzer 134 stores the one or more multi-account adjustment vectors 432 in an example multi-account factor database 440. In the example of FIG. 4, the adjustment factor analyzer 134 stores the one or more sharing factor adjustment matrices 434 in an example truncated singular value decomposition (TSVD) factor database 442. In the example of FIG. 4, the adjustment factor analyzer 134 stores the one or more non-coverage adjustment vectors 436 in an example non-coverage factor database 444. In the example of FIG. 4, the adjustment factor analyzer 134 stores the one or more co-viewing adjustment vectors 438 in an example co-viewing factor database 446.

In the illustrate example of FIG. 4, the process flow 400 includes an example fourth subprocess 448 that corresponds to impression adjustment. In the example subprocess 448, the audience metrics analyzer 154 ingests example raw aggregated impression data 450 from an example CTV aggregation database 452. In the example of FIG. 4, the raw aggregated impression data 450 includes corrected demographics that have been corrected by a demographics correction model (DCM). For example, the example data aggregator 148 in the privacy-protected cloud environment 106 generates the raw aggregated impression data 450 and stores the raw aggregated impression data 450 in the CTV aggregation database 452. In some examples, the CTV aggregation database 452 corresponds to the example aggregated campaign data database 150 stored in the AME output data store 138.

In the illustrated example of FIG. 4, based on the raw aggregated impression data 450 from the CTV aggregation database 452, the audience metrics analyzer 154 executes and/or instantiates an example impression compensation operation 454, an example demographic imputation operation 456, an example demographic redistribution operation 458, and an example logical consistency operation 460. For example, at the example impression compensation operation 454, the audience metrics analyzer 154 compensates for missing impressions in the raw aggregated impression data 450 provided by the database proprietor 102. At the example demographic imputation operation 456, per cluster of the raw aggregated impression data 450, the audience metrics analyzer 154 imputes impressions and unique audience size for demographics in the raw aggregated impression data 450 for which not impressions were reported by the database proprietor 102.

In the illustrated example of FIG. 4, at the example demographic redistribution operation 458, per cluster, the audience metrics analyzer 154 performs demographic redistribution for impressions in the raw aggregated impression data 450 having unknown demographics. At the example logical consistency operation 460, the audience metrics analyzer 154 verifies that impressions for each demographic of a cluster are logically consistent with the overall impressions for the cluster. Subsequently, the audience metrics analyzer 154 stores (e.g., causes storage) of prepared raw aggregated impression data 462 in the aggregated campaign data database 150 and/or forwards the data for further processing.

In the illustrated example of FIG. 4, the audience metrics analyzer 154 executes and/or instantiates an example multiple account bias correction operation 464 to process a per cluster demographic impressions vector from the prepared raw aggregated impression data 462 to correct for registered users of the database proprietor 102 having multiple accounts. For example, the audience metrics analyzer 154 multiplies a multi-account adjustment vector (e.g., stored in the multi-account factor database 440) corresponding to the cluster by the per cluster demographic impressions vector. In the example of FIG. 4, the audience metrics analyzer 154 executes and/or instantiates an example sharing correction operation 466 to process the resulting per cluster demographic impressions vector from the multi-account bias correction operation 464 to correct for users of the database proprietor 102 that share a user account. For example, the audience metrics analyzer 154 multiplies an account sharing adjustment matrix (e.g., stored in the TSVD factor database 442) corresponding to the cluster by the resulting per cluster demographic impressions vector data from the multi-account bias correction operation 464.

In the illustrated example of FIG. 4, the audience metrics analyzer 154 executes and/or instantiates an example non-coverage correction operation 468 to process the resulting per cluster demographic impressions vector from the sharing correction operation 466 to correct for impressions recorded by the database proprietor 102 that cannot be matched to a particular registered user of the database proprietor 102. For example, the audience metrics analyzer 154 multiplies a non-coverage adjustment vector (e.g., stored in the non-coverage factor database 444) corresponding to the cluster by the resulting per cluster demographic impressions vector data from the sharing correction operation 466. In the example of FIG. 4, the audience metrics analyzer 154 executes and/or instantiates an example scaling operation 470 to process the resulting per cluster demographic impressions vector from the non-coverage correction operation 468 to ensure logical consistency.

In the illustrated example of FIG. 4, the audience metrics analyzer 154 executes and/or instantiates an example co-viewing operation 472 to process the resulting per cluster demographic impressions vector from the scaling operation 470 to correct for viewing events including multiple viewers. For example, the audience metrics analyzer 154 multiplies a co-viewing adjustment vector (e.g., stored in the co-viewing factor database 446) corresponding to the cluster by the resulting per cluster demographic impressions vector data from the scaling operation 470.

In the illustrated example of FIG. 4, the audience metrics analyzer 154 executes and/or instantiates an example roll-up operation 474 to form a composite demographic impressions vector for each demographic of a hierarchical level of the raw aggregated impression data 450. In the example of FIG. 4, the audience metrics analyzer 154 executes and/or instantiates an example preprocessing operation 476 to preprocess composite demographic impressions vectors. In some examples, the audience metrics analyzer 154 causes storage (e.g., stores) the preprocessed composite demographic impressions vectors in an example rolled up unique audience and impressions database 478.

Figure 12:
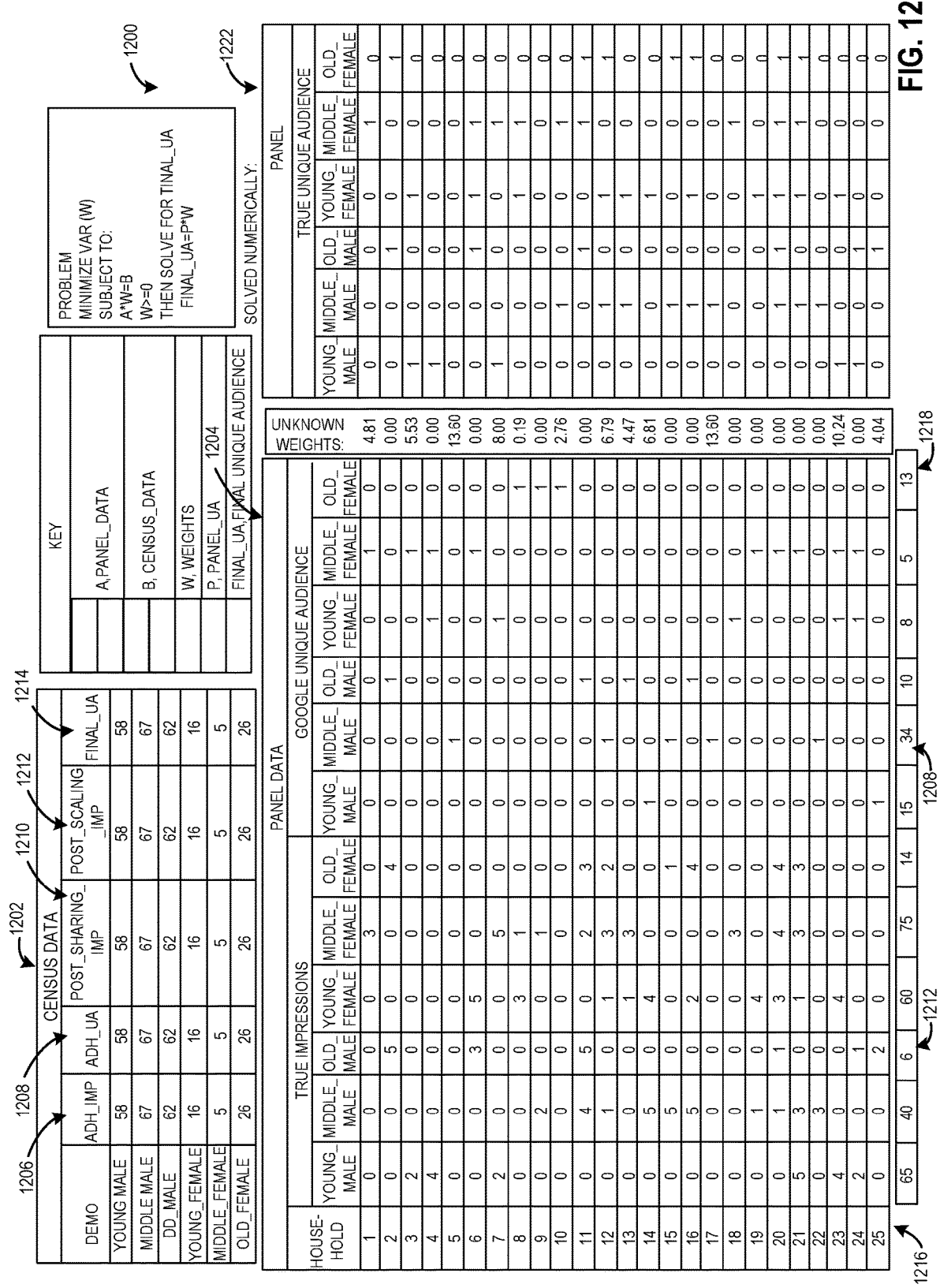
FIG. 12 is a graphical illustration of example unique audience size determination disclosed herein.

In the illustrated example of FIG. 4, the audience metrics analyzer 154 executes and/or instantiates an example unique audience estimation operation 480. In the example of FIG. 4, the audience metrics analyzer 154 estimates a unique audience for each inventory type of the database proprietor 102 (e.g., YouTube Main and YouTube TV). For example, the audience metrics analyzer 154 determines an example weight set by finding the minimum variance of weights with the three constraints described above. Example unique audience size determination is illustrated in FIG. 12. After determining unique audience size per inventory type, the audience metrics analyzer 154 executes and/or instantiates an example deduplication operation 482 to deduplicate repeat audience members across different inventory types.

FIG. 12 is a graphical illustration of example unique audience size determination process 1200. The example unique audience size determination process 1200 includes example census data 1202 and example panel data 1204. In the example of FIG. 12, the census data 1202 includes example impressions 1206 reported by the database proprietor 102, example unique audience 1208 reported by the database proprietor 102, impressions after adjusting for account sharing 1210, impressions after scaling 1212, and a final unique audience (UA) 1214. The census data 1202 is subdivided into demographics including young male, middle aged male, old male, young female, middle aged female, and old female.

In the illustrated example of FIG. 12, the example panel data 1204 includes example matching panelists impressions 1216 and example matching Google account unique audience 1218. The example panel data 1204 is subdivided into demographics including young male, middle aged male, old male, young female, middle aged female, and old female. In the example of FIG. 12, the audience estimation circuitry 312 determines an example weight set 1220 by finding the minimum variance of weights subject to three constraints as illustrated in equation 1 below.

$$\min \mathrm{var}(w)$$

subject to:

$$A*w=b$$

$$w>0 \quad \text{Equation 1}$$

In the illustrated example of FIG. 12, the first constraint and the second constraint are represented by A*w=b. The first constraint is that the sum of the products of the weight set 1220 and the matching panelists impressions 1216 be equal to (or within a threshold of) the impressions after scaling 1212. The second constraint is that the sum of the products of the weight set 1220 and the matching Google account unique audience 1218 be equal to (or within a threshold of) the unique audience 1208. The third constraint is that the weight set 1220 be greater than or equal to zero. After computing the weight set 1220, the audience estimation circuitry 312 computes the final UA 1214 by multiplying the weight set 1220 by example unique audience size per demographic 1222 as reported by the AME 104. The unique audience size per demographic 1222 is subdivided into demographics including young male, middle aged male, old male, young female, middle aged female, and old female.

While an example manner of implementing the adjustment factor analyzer 134 of FIG. 1 is illustrated in FIG. 2 and an example manner of implementing the audience metrics analyzer 154 of FIG. 1 is illustrated in FIG. 3, one or more of the elements, processes, and/or devices illustrated in FIGS. 2 and/or 3 may be combined, divided, re-arranged, omitted, eliminated, and/or implemented in any other way. Further, the example data matching analyzer 128, the example communication circuitry 202, the example multi-account adjustment factor generation circuitry 204, the example account sharing adjustment factor generation circuitry 206, the example non-coverage adjustment factor generation circuitry 208, the example co-viewing adjustment factor generation circuitry 210, and/or, more generally, the example adjustment factor analyzer 134 of FIGS. 1 and/or 2, and/or the example communication circuitry 302, the example impression compensation circuitry 304, the example demographic redistribution circuitry 306, the example adjustment circuitry 308, the example audience estimate preprocessing circuitry 310, the example audience estimation circuitry 312, the example deduplication circuitry 314, and/or, more generally, the example audience metrics analyzer 154 of FIGS. 1 and/or 3, may be implemented by hardware, software, firmware, and/or any combination of hardware, software, and/or firmware. Thus, for example, any of the example data matching analyzer 128, the example communication circuitry 202, the example multi-account adjustment factor generation circuitry 204, the example account sharing adjustment factor generation circuitry 206, the example non-coverage adjustment factor generation circuitry 208, the example co-viewing adjustment factor generation circuitry 210, and/or, more generally, the example adjustment factor analyzer 134 of FIGS. 1 and/or 2, and/or the example communication circuitry 302, the example impression compensation circuitry 304, the example demographic redistribution circuitry 306, the example adjustment circuitry 308, the example audience estimate preprocessing circuitry 310, the example audience estimation circuitry 312, the example deduplication circuitry 314, and/or, more generally, the example audience metrics analyzer 154 of FIGS. 1 and/or 3, could be implemented by processor circuitry, analog circuit(s), digital circuit(s), logic circuit(s), programmable processor(s), programmable microcontroller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)) such as Field Programmable Gate Arrays (FPGAs). Further still, the example adjustment factor analyzer 134 of FIGS. 1 and/or 2 may include one or more elements, processes, and/or devices in addition to, or instead of, those illustrated in FIG. 2, and/or may include more than one of any or all of the illustrated elements, processes and devices. Additionally, the example audience metrics analyzer 154 of FIGS. 1 and/or 3 may include one or more elements, processes, and/or devices in addition to, or instead of, those illustrated in FIG. 3, and/or may include more than one of any or all of the illustrated elements, processes and devices.

Figure 5:
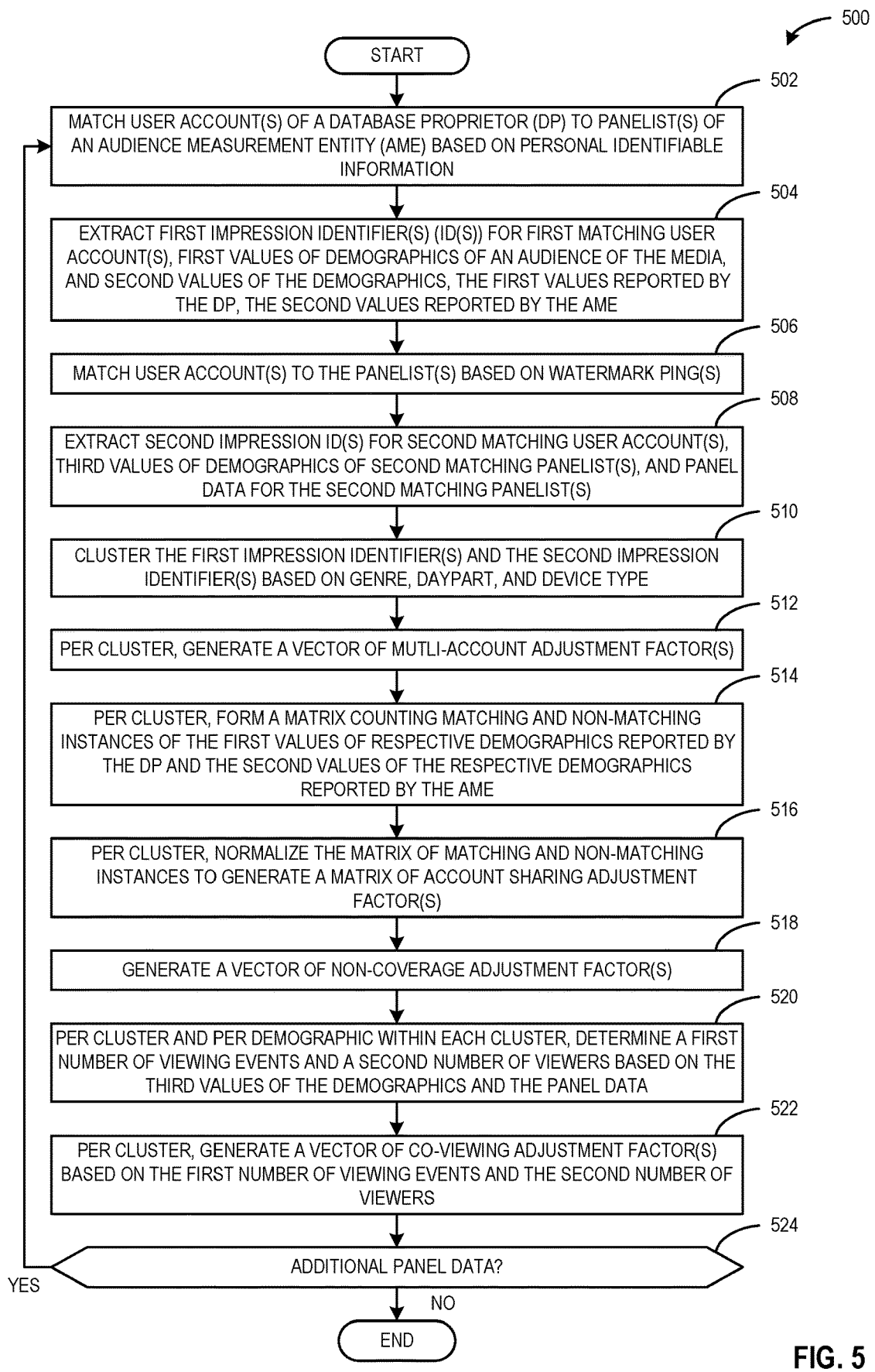
FIG. 5 is a flowchart representative of example machine readable instructions and/or example operations that may be executed and/or instantiated by processor circuitry to implement the adjustment factor analyzer of FIGS. 1 and/or 2.
Figure 6:
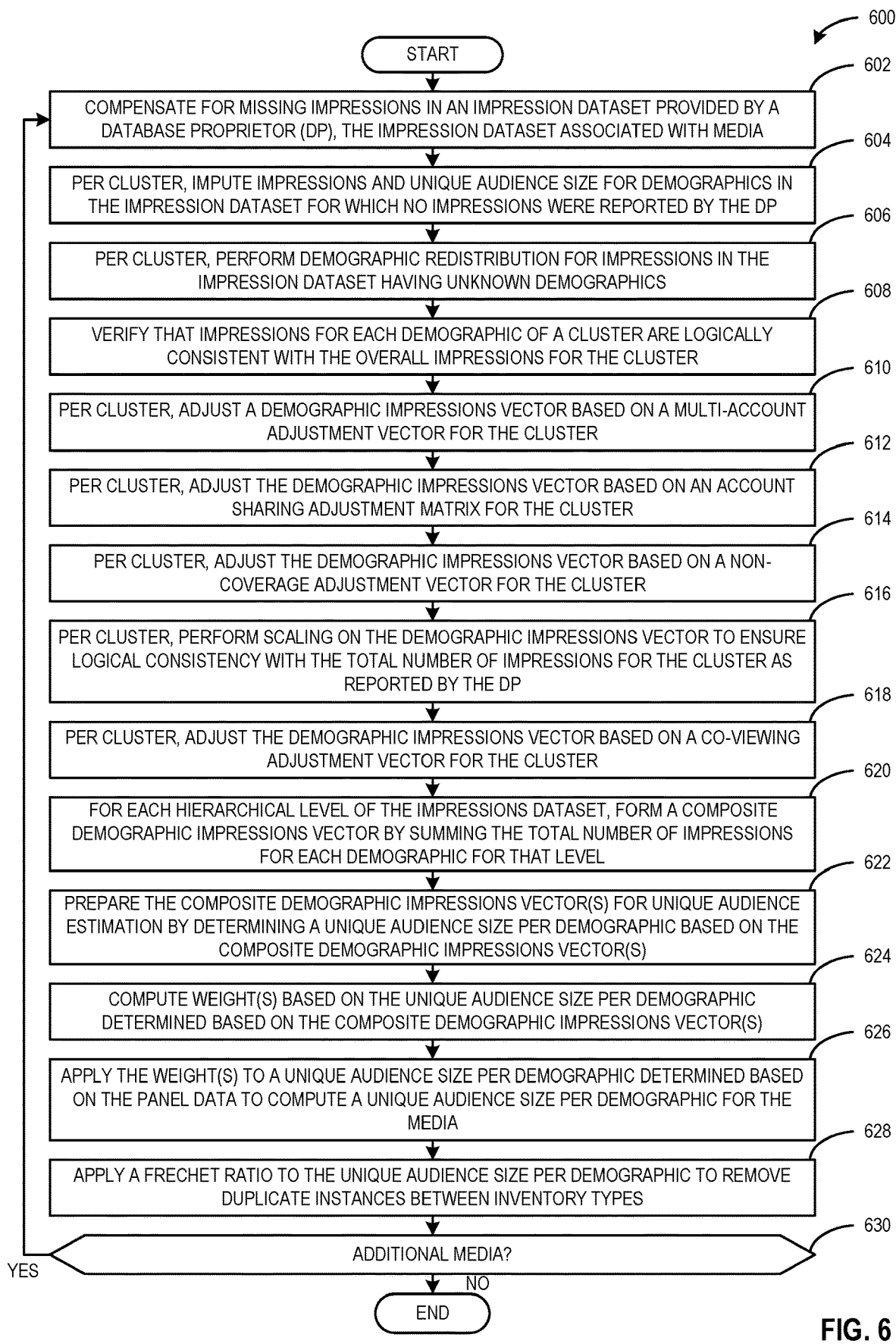
FIG. 6 is a flowchart representative of example machine readable instructions and/or example operations that may be executed and/or instantiated by processor circuitry to implement the audience metrics analyzer of FIGS. 1 and/or 3.

A flowchart representative of example machine readable instructions, which may be executed to configure processor circuitry to implement the data matching analyzer 128 of FIG. 1 and/or the adjustment factor analyzer 134 of FIGS. 1 and/or 2, is shown in FIG. 5. A flowchart representative of example machine readable instructions, which may be executed to configure processor circuitry to implement the audience metrics analyzer 154 of FIGS. 1 and/or 3, is shown in FIG. 6. The machine readable instructions may be one or more executable programs or portion(s) of an executable program for execution by processor circuitry, such as the processor circuitry 712 shown in the example processor platform 700 discussed below in connection with FIG. 7 and/or the example processor circuitry discussed below in connection with FIGS. 8 and/or 9. The program may be embodied in software stored on one or more non-transitory computer readable storage media such as a compact disk (CD), a floppy disk, a hard disk drive (HDD), a solid-state drive (SSD), a digital versatile disk (DVD), a Blu-ray disk, a volatile memory (e.g., Random Access Memory (RAM) of any type, etc.), or a non-volatile memory (e.g., electrically erasable programmable read-only memory (EEPROM), FLASH memory, an HDD, an SSD, etc.) associated with processor circuitry located in one or more hardware devices, but the entire program and/or parts thereof could alternatively be executed by one or more hardware devices other than the processor circuitry and/or embodied in firmware or dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a user) or an intermediate client hardware device (e.g., a radio access network (RAN)) gateway that may facilitate communication between a server and an endpoint client hardware device). Similarly, the non-transitory computer readable storage media may include one or more mediums located in one or more hardware devices. Further, although the example program is described with reference to the flowchart illustrated in FIG. 5, many other methods of implementing the example data matching analyzer 128 of FIG. 1 and/or the example adjustment factor analyzer 134 of FIGS. 1 and/or 2 may alternatively be used. Additionally, although the example program is described with reference to the flowchart illustrated in FIG. 6, many other methods of implementing the example audience metrics analyzer 154 of FIGS. 1 and/or 3 may alternatively be used. For example, the order of execution of the blocks may be changed, and/or some of the blocks described may be changed, eliminated, or combined. Additionally or alternatively, any or all of the blocks may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more hardware devices (e.g., a single-core processor (e.g., a single core central processor unit (CPU)), a multi-core processor (e.g., a multi-core CPU, an XPU, etc.) in a single machine, multiple processors distributed across multiple servers of a server rack, multiple processors distributed across one or more server racks, a CPU and/or a FPGA located in the same package (e.g., the same integrated circuit (IC) package or in two or more separate housings, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., as portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of machine executable instructions that implement one or more operations that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc., in order to execute the machine readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C #, Perl, Python, JavaScript, HyperText Markup Language (HTML), Structured Query Language (SQL), Swift, etc.

As mentioned above, the example operations of FIGS. 5 and/or 6 may be implemented using executable instructions (e.g., computer and/or machine readable instructions) stored on one or more non-transitory computer and/or machine readable media such as optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms non-transitory computer readable medium, non-transitory computer readable storage medium, non-transitory machine readable medium, and non-transitory machine readable storage medium are expressly defined to include any type of computer readable storage device and/or storage disk and to exclude propagating signals and to exclude transmission media. As used herein, the terms "computer readable storage device" and "machine readable storage device" are defined to include any physical (mechanical and/or electrical) structure to store information, but to exclude propagating signals and to exclude transmission media. Examples of computer readable storage devices and machine readable storage devices include random access memory of any type, read only memory of any type, solid state memory, flash memory, optical discs, magnetic disks, disk drives, and/or redundant array of independent disks (RAID) systems. As used herein, the term "device" refers to physical structure such as mechanical and/or electrical equipment, hardware, and/or circuitry that may or may not be configured by computer readable instructions, machine readable instructions, etc., and/or manufactured to execute computer readable instructions, machine readable instructions, etc.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a," "an," "first," "second," etc.) do not exclude a plurality. The term "a" or "an" object, as used herein, refers to one or more of that object. The terms "a" (or "an"), "one or more," and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

FIG. 5 is a flowchart representative of example machine readable instructions and/or example operations 500 that may be executed and/or instantiated by processor circuitry to implement the adjustment factor analyzer 134 of FIGS. 1 and/or 2. The machine readable instructions and/or operations 500 of FIG. 5 begin at block 502, at which the data matching analyzer 128 matches one or more user accounts of the database proprietor 102 to one or more panelists of the AME 104 based on PII associated with the one or more user accounts and the one or more panelists. At block 504, the data matching analyzer 128 extracts first impression identifiers (e.g., CPNs) for one or more first matching user accounts, first values for demographics (e.g., covariates) of an audience of the media, and second values for the demographics of the audience of the media. For example, the first values for the demographics of the audience are extracted from the one or more first matching user accounts as reported by the database proprietor 102. Additionally, for example, the second values for the demographics of the audience are extracted from one or more first panelists that are matched to the one or more first matching user accounts.

In the illustrated example of FIG. 5, at block 506, the data matching analyzer 128 matches one or more user accounts of the database proprietor 102 to the one or more panelists of the AME 104 based on watermark pings associated with the one or more user accounts and the one or more panelists. At block 508, the data matching analyzer 128 extracts second impression identifiers (e.g., CPNs) for one or more second matching user accounts, third values for demographics of the audience of the media, and panel data for one or more matching panelists as reported in the AME panel data. For example, the third values for the demographics of the audience are extracted from one or more second panelists that are matched to the one or more second matching user accounts. Additionally, the panel data, including viewing events and corresponding viewers per viewing event, are extracted for the one or more second panelists that are matched to the one or more second matching user accounts.

In the illustrated example of FIG. 5, at block 510, the data matching analyzer 128 clusters the first impression identifiers and the second impression identifiers based on a genre of the media, a time of day during which the media was requested, and a type of a device with which the media was requested. Additionally, clusters may be distinguished based the inventory type (e.g., YouTube Main or YouTube TV) from which the impressions were generated. Clusters may be subdivided into different demographics reported for the impressions. At block 512, per cluster, the multi-account adjustment factor generation circuitry 204 generates a vector of one or more multi-account adjustment factors. For example, the multi-account adjustment factor generation circuitry 204 generates the multi-account adjustment vector based on data about the number of accounts registered users of the database proprietor 102 have had historically (e.g., historic data).

In the illustrated example of FIG. 5, at block 514, per cluster, the account sharing adjustment factor generation circuitry 206 forms a matrix counting matching and non-matching instances of the first values of respective demographics reported by the database proprietor 102 for the one or more first matching user accounts and the second values of the respective demographics reported by the AME 104 for the one or more matching panelists. At block 516, per cluster, the account sharing adjustment factor generation circuitry 206 normalizes the matrix of matching and non-matching instances to generate a matrix of one or more account sharing adjustment factors.

In the illustrated example of FIG. 5, at block 518, per cluster, the non-coverage adjustment factor generation circuitry 208 generates a vector of one or more non-coverage adjustment factors. For example, the non-coverage adjustment factor generation circuitry 208 generates the non-coverage adjustment vector based on historic data indicating that non-coverage adjustment factors greater than one (e.g., >1) provide effective adjustment for non-coverage. At block 520, per cluster and per demographic subdivision with each cluster, the co-viewing adjustment factor generation circuitry 210 determines a first number of viewing events and a second number of viewers for the viewing events based on the third values for the demographics and the panel data.

In the illustrated example of FIG. 5, at block 522, per cluster, the co-viewing adjustment factor generation circuitry 210 generates a vector of one or more co-viewing adjustment factors based on the first number of viewing event and the second number of viewers. At block 524, the communication circuitry 202 determines whether there is additional panel data for the media. In response to the communication circuitry 202 determining that there is additional panel data (block 524: YES), the machine readable instructions and/or the operations 500 returns to block 502. In response to the communication circuitry 202 determining that there is not additional panel data (block 524: NO), the machine readable instructions and/or the operations 500 terminate.

FIG. 6 is a flowchart representative of example machine readable instructions and/or example operations 600 that may be executed and/or instantiated by processor circuitry to implement the audience metrics analyzer 154 of FIGS. 1 and/or 3. The machine readable instructions and/or the operations 600 of FIG. 6 begin at block 602, at which the impression compensation circuitry 304 compensates for missing impressions in an impression dataset (e.g., the aggregated campaign data) provided by the database proprietor 102, the impression dataset associated with media (e.g., an advertising campaign, an episode of a television show, etc.). As described above, the privacy constraints imposed on the data within the privacy-protected cloud environment 106 include a limitation that data cannot be extracted (even when aggregated) for less than a threshold number of individuals (e.g., 50 individuals). Accordingly, if impressions for a particular demographic subdivision include less than the threshold number, the data aggregator 148 will not provide such data to be stored in the aggregated campaign data database 150. Accordingly, the omission of such data can create logic inconsistencies in the aggregated campaign data.

In the illustrated example of FIG. 6, at block 604, per cluster, the impression compensation circuitry 304 imputes impressions and unique audience size for demographics in the impression dataset for which no impressions were reported by the database proprietor 102. For example, the data represented in the impressions dataset may be subdivided by demographics reported for a cluster. In some examples, due to the privacy restrictions some of the demographic subdivisions may not be associated with any impressions and/or a unique audience size for those demographic subdivisions. At block 606, the demographic redistribution circuitry 306 performs demographic redistribution of impressions in the impression dataset for which no demographics were reported. For example, impressions represented in the impression dataset may be associated with no demographic subdivision (e.g., totally unknown demographics) or a limited demographic subdivision (e.g., the impression is associated with an older person (e.g., above 35), but no information is known about the gender of the person).

In the illustrated example of FIG. 6, at block 608, the impression compensation circuitry 304 verifies that impressions for each demographic subdivision of a cluster are logically consistent with the overall impressions for the cluster. For example, the impression compensation circuitry 304 sums the demographic redistributed impressions (e.g., the number of impressions per demographic subdivision after processing by the demographic redistribution circuitry 306) for all demographic subdivisions of a cluster. The impression compensation circuitry 304 compares the summed demographic redistribute impressions for the cluster to the total number of impressions reported for the cluster.

In the illustrated example of FIG. 6, at block 610, per cluster, the adjustment circuitry 308 adjusts a demographic impressions vector based on a multi-account adjustment vector for the cluster. For example, at block 610, the adjustment circuitry 308 performs matrix multiplication between the demographic impressions vector and the multi-account adjustment vector. At block 612, per cluster, the adjustment circuitry 308 adjusts the demographic impressions vector based on an account sharing adjustment matrix for the cluster. As described above, the account sharing adjustment matrix for a cluster includes probabilities that a user account has first values for demographics (e.g., as reported by the database proprietor 102) if a matching panelist has second values for the demographics.

In the illustrated example of FIG. 6, at block 614, per cluster, the adjustment circuitry 308 adjusts the demographic impressions vector based on a non-coverage adjustment vector for the cluster. For example, the adjustment circuitry 308 performs matrix multiplication between the demographic impressions vector and the non-coverage adjustment vector. Additionally, at block 616, per cluster, the adjustment circuitry 308 scales the demographic impressions vector to ensure logical consistency with the total number of impressions for the cluster as reported by the database proprietor 102. As described above, in some examples, when adjusting the demographic impressions vector for a cluster with the multi-account adjustment vector, the account sharing adjustment matrix, and the non-coverage adjustment vector values of the resultant demographic impressions vector may be rounded to a whole number (e.g., because impressions are typically whole numbers and may not be fractional). This rounding can cause logical inconsistencies in the data.

In the illustrated example of FIG. 6, at block 618, per cluster, the adjustment circuitry 308 adjusts the demographic impressions vector based on a co-viewing adjustment vector for the cluster. At block 620, for each hierarchical level of the impression dataset, the audience estimate preprocessing circuitry 310 forms a composite demographic impressions vector by summing the total number of impressions for each demographic subdivision for the hierarchical level. For example, hierarchical levels include a level of audience size per individual media placement per inventory type, a level of audience size per individual media placement across all inventory types, a level of audience size per site per inventory type, a level of audience size per site across all inventory types, a level of audience size per media campaign per inventory type, and/or a level of audience size per media campaign across all inventory types.

In the illustrated example of FIG. 6, at block 622, the audience estimate preprocessing circuitry 310 prepares the one or more composite demographic impressions vectors for unique audience estimation by determining a unique audience size per demographic subdivision based on the composite demographic impressions vector. At block 624, the audience estimation circuitry 312 computes one or more weights (e.g., a weight set) based on the unique audience size per demographic subdivision determined based don the composite demographic impression vectors. For example, the audience estimation circuitry 312 determines the one or more weights by finding the minimum variance of the one or more weights subject to the three constraints described above.

In the illustrated example of FIG. 6, at block 626, the audience estimation circuitry 312 applies the one or more weights to a unique audience size per demographic subdivision for the media as determined based on the AME panel data. For example, the audience estimation circuitry 312 multiplies the one or more weights by a unique audience size per demographic subdivision to compute a unique audiences size per demographic subdivision for the media. In the example of FIG. 6, at block 628, the deduplication circuitry 314 applies a Frechet ratio to the unique audiences size per demographic subdivision for the media to remove duplicate audience members across inventory types of the database proprietor 102 (e.g., YouTube Main and YouTube TV).

In the illustrated example of FIG. 6, at block 630, the communication circuitry 302 determines whether there is additional media. In response to the communication circuitry 302 determining that there is additional media (block 630: YES), the machine readable instructions and/or the operations 600 returns to block 602. In response to the communication circuitry 302 determining that there is not additional media (block 630: NO), the machine readable instructions and/or the operations 600 terminate.

Figure 7:
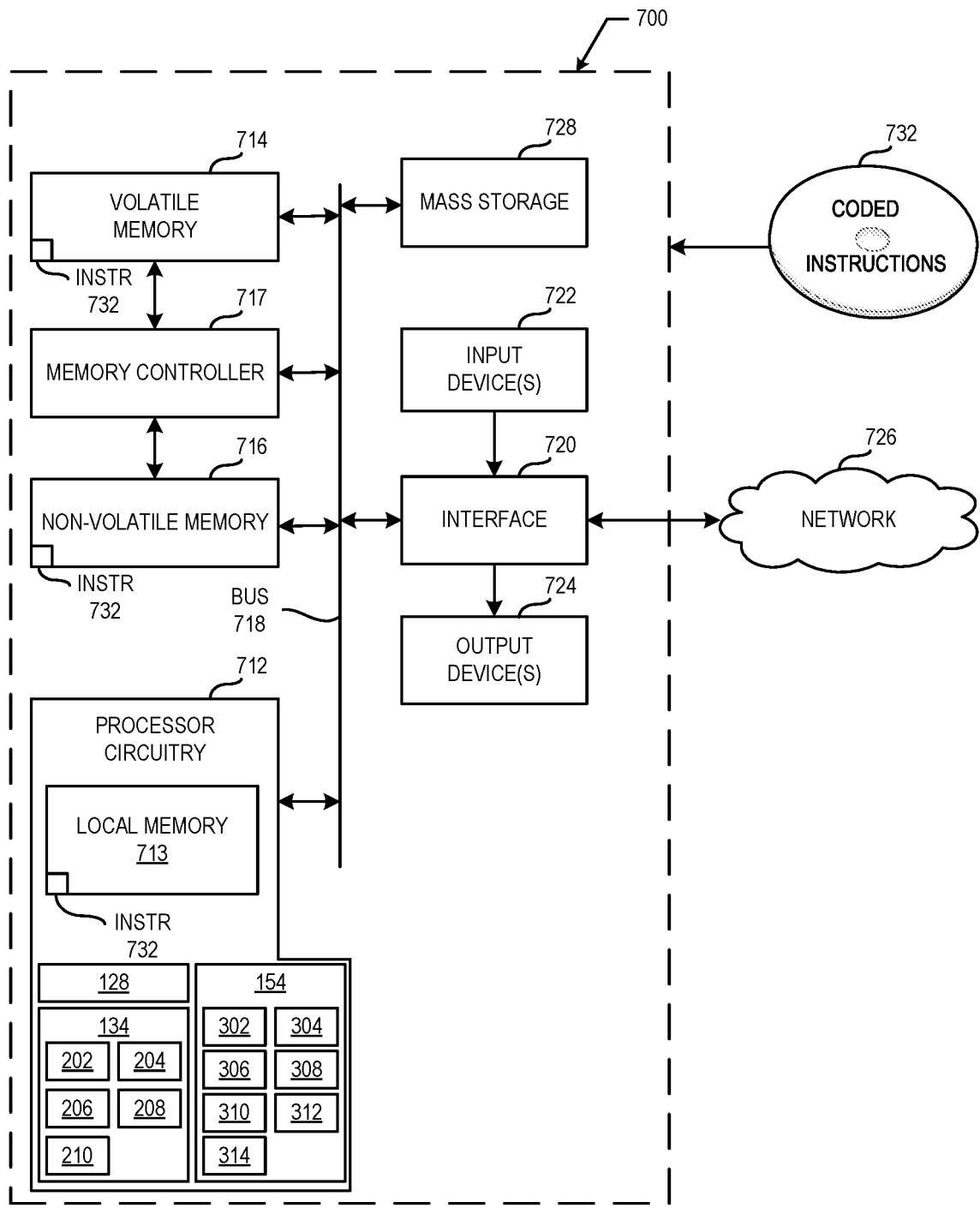
FIG. 7 is a block diagram of an example processing platform including processor circuitry structured to execute example machine readable instructions to implement examples disclosed herein.

FIG. 7 is a block diagram of an example processor platform 700 structured to execute and/or instantiate machine readable instructions and/or operations 500 of FIG. 5 to implement the data matching analyzer 128 of FIG. 1 and/or the adjustment factor analyzer 134 of FIGS. 1 and/or 2 and/or to execute and/or instantiate machine readable instructions and/or operations 600 of FIG. 6 to implement the audience metrics analyzer 154 of FIGS. 1 and/or 3. The processor platform 700 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset (e.g., an augmented reality (AR) headset, a virtual reality (VR) headset, etc.) or other wearable device, or any other type of computing device.

The processor platform 700 of the illustrated example includes processor circuitry 712. The processor circuitry 712 of the illustrated example is hardware. For example, the processor circuitry 712 can be implemented by one or more integrated circuits, logic circuits, FPGAs microprocessors, CPUs, GPUs, DSPs, and/or microcontrollers from any desired family or manufacturer. The processor circuitry 712 may be implemented by one or more semiconductor based (e.g., silicon based) devices. In this example, the processor circuitry 712 implements the example data matching analyzer 128, the example communication circuitry 202, the example multi-account adjustment factor generation circuitry 204, the example account sharing adjustment factor generation circuitry 206, the example non-coverage adjustment factor generation circuitry 208, the example co-viewing adjustment factor generation circuitry 210, and/or, more generally, the example adjustment factor analyzer 134 of FIGS. 1 and/or 2, and/or the example communication circuitry 302, the example impression compensation circuitry 304, the example demographic redistribution circuitry 306, the example adjustment circuitry 308, the example audience estimate preprocessing circuitry 310, the example audience estimation circuitry 312, the example deduplication circuitry 314, and/or, more generally, the example audience metrics analyzer 154 of FIGS. 1 and/or 3.

The processor circuitry 712 of the illustrated example includes a local memory 713 (e.g., a cache, registers, etc.). The processor circuitry 712 of the illustrated example is in communication with a main memory including a volatile memory 714 and a non-volatile memory 716 by a bus 718. The volatile memory 714 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 716 may be implemented by flash memory and/or any other desired type of memory device. Access to the main memory 714, 716 of the illustrated example is controlled by a memory controller 717.

The processor platform 700 of the illustrated example also includes interface circuitry 720. The interface circuitry 720 may be implemented by hardware in accordance with any type of interface standard, such as an Ethernet interface, a universal serial bus (USB) interface, a Bluetooth® interface, a near field communication (NFC) interface, a PCI interface, and/or a PCIe interface.

In the illustrated example, one or more input devices 722 are connected to the interface circuitry 720. The input device(s) 722 permit(s) a user to enter data and/or commands into the processor circuitry 712. The input device(s) 722 can be implemented by, for example, an audio sensor, a microphone, a camera (still or video), a keyboard, a button, a mouse, a touchscreen, a track-pad, a trackball, an isopoint device, and/or a voice recognition system.

One or more output devices 724 are also connected to the interface circuitry 720 of the illustrated example. The output devices 724 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 720 of the illustrated example, thus, typically includes a graphics driver card, a graphics driver chip, and/or graphics processor circuitry such as a GPU.

The interface circuitry 720 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 726. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 700 of the illustrated example also includes one or more mass storage devices 728 to store software and/or data. Examples of such mass storage devices 728 include magnetic storage devices, optical storage devices, floppy disk drives, HDDs, CDs, Blu-ray disk drives, redundant array of independent disks (RAID) systems, solid state storage devices such as flash memory devices, and DVD drives.

Figure 8:
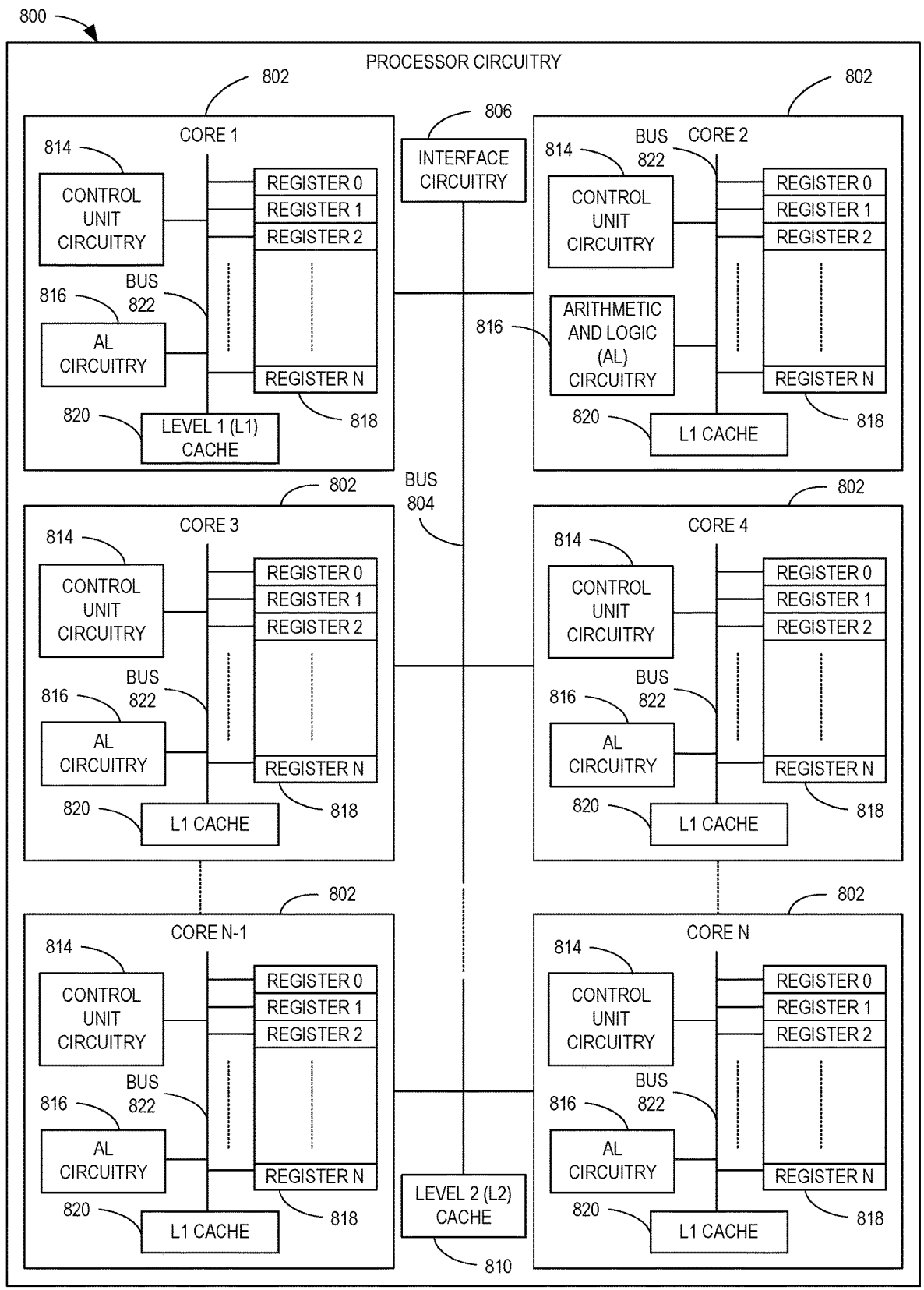
FIG. 8 is a block diagram of an example implementation of the processor circuitry of FIG. 7.

The machine executable instructions 732, which may be implemented by the machine readable instructions and/or the operations 500 of FIG. 5 and/or the machine readable instructions and/or the operations 600 of FIG. 6, may be stored in the mass storage device 728, in the volatile memory 714, in the non-volatile memory 716, and/or on a removable non-transitory computer readable storage medium such as a CD or DVD.

FIG. 8 is a block diagram of an example implementation of the processor circuitry 712 of FIG. 7. In this example, the processor circuitry 712 of FIG. 7 is implemented by a microprocessor 800. For example, the microprocessor 800 may implement multi-core hardware circuitry such as a CPU, a DSP, a GPU, an XPU, etc. Although it may include any number of example cores 802 (e.g., 1 core), the microprocessor 800 of this example is a multi-core semiconductor device including N cores. The cores 802 of the microprocessor 800 may operate independently or may cooperate to execute machine readable instructions. For example, machine code corresponding to a firmware program, an embedded software program, or a software program may be executed by one of the cores 802 or may be executed by multiple ones of the cores 802 at the same or different times. In some examples, the machine code corresponding to the firmware program, the embedded software program, or the software program is split into threads and executed in parallel by two or more of the cores 802. The software program may correspond to a portion or all of the machine readable instructions and/or operations represented by the flowcharts of FIGS. 5 and/or 6.

The cores 802 may communicate by an example bus 804. In some examples, the bus 804 may implement a communication bus to effectuate communication associated with one(s) of the cores 802. For example, the bus 804 may implement at least one of an Inter-Integrated Circuit (I2C) bus, a Serial Peripheral Interface (SPI) bus, a PCI bus, or a PCIe bus. Additionally or alternatively, the bus 804 may implement any other type of computing or electrical bus. The cores 802 may obtain data, instructions, and/or signals from one or more external devices by example interface circuitry 806. The cores 802 may output data, instructions, and/or signals to the one or more external devices by the interface circuitry 806. Although the cores 802 of this example include example local memory 820 (e.g., Level 1 (L1) cache that may be split into an L1 data cache and an L1 instruction cache), the microprocessor 800 also includes example shared memory 810 that may be shared by the cores (e.g., Level 2 (L2_cache)) for high-speed access to data and/or instructions. Data and/or instructions may be transferred (e.g., shared) by writing to and/or reading from the shared memory 810. The local memory 820 of each of the cores 802 and the shared memory 810 may be part of a hierarchy of storage devices including multiple levels of cache memory and the main memory (e.g., the main memory 714, 716 of FIG. 7). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 802 may be referred to as a CPU, DSP, GPU, etc., or any other type of hardware circuitry. Each core 802 includes control unit circuitry 814, arithmetic and logic (AL) circuitry 816 (sometimes referred to as an ALU), a plurality of registers 818, the L1 cache 820, and an example bus 822. Other structures may be present. For example, each core 802 may include vector unit circuitry, single instruction multiple data (SIMD) unit circuitry, load/store unit (LSU) circuitry, branch/jump unit circuitry, floating-point unit (FPU) circuitry, etc. The control unit circuitry 814 includes semiconductor-based circuits structured to control (e.g., coordinate) data movement within the corresponding core 802. The AL circuitry 816 includes semiconductor-based circuits structured to perform one or more mathematic and/or logic operations on the data within the corresponding core 802. The AL circuitry 816 of some examples performs integer based operations. In other examples, the AL circuitry 816 also performs floating point operations. In yet other examples, the AL circuitry 816 may include first AL circuitry that performs integer based operations and second AL circuitry that performs floating point operations. In some examples, the AL circuitry 816 may be referred to as an Arithmetic Logic Unit (ALU). The registers 818 are semiconductor-based structures to store data and/or instructions such as results of one or more of the operations performed by the AL circuitry 816 of the corresponding core 802. For example, the registers 818 may include vector register(s), SIMD register(s), general purpose register(s), flag register(s), segment register(s), machine specific register(s), instruction pointer register(s), control register(s), debug register(s), memory management register(s), machine check register(s), etc. The registers 818 may be arranged in a bank as shown in FIG. 8. Alternatively, the registers 818 may be organized in any other arrangement, format, or structure including distributed throughout the core 802 to shorten access time. The bus 822 may implement at least one of an I2C bus, a SPI bus, a PCI bus, or a PCIe bus Each core 802 and/or, more generally, the microprocessor 800 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 800 is a semiconductor device fabricated to include many transistors interconnected to implement the structures described above in one or more integrated circuits (ICs) contained in one or more packages. The processor circuitry may include and/or cooperate with one or more accelerators. In some examples, accelerators are implemented by logic circuitry to perform certain tasks more quickly and/or efficiently than can be done by a general purpose processor. Examples of accelerators include ASICs and FPGAs such as those discussed herein. A GPU or other programmable device can also be an accelerator. Accelerators may be on-board the processor circuitry, in the same chip package as the processor circuitry and/or in one or more separate packages from the processor circuitry.

Figure 9:
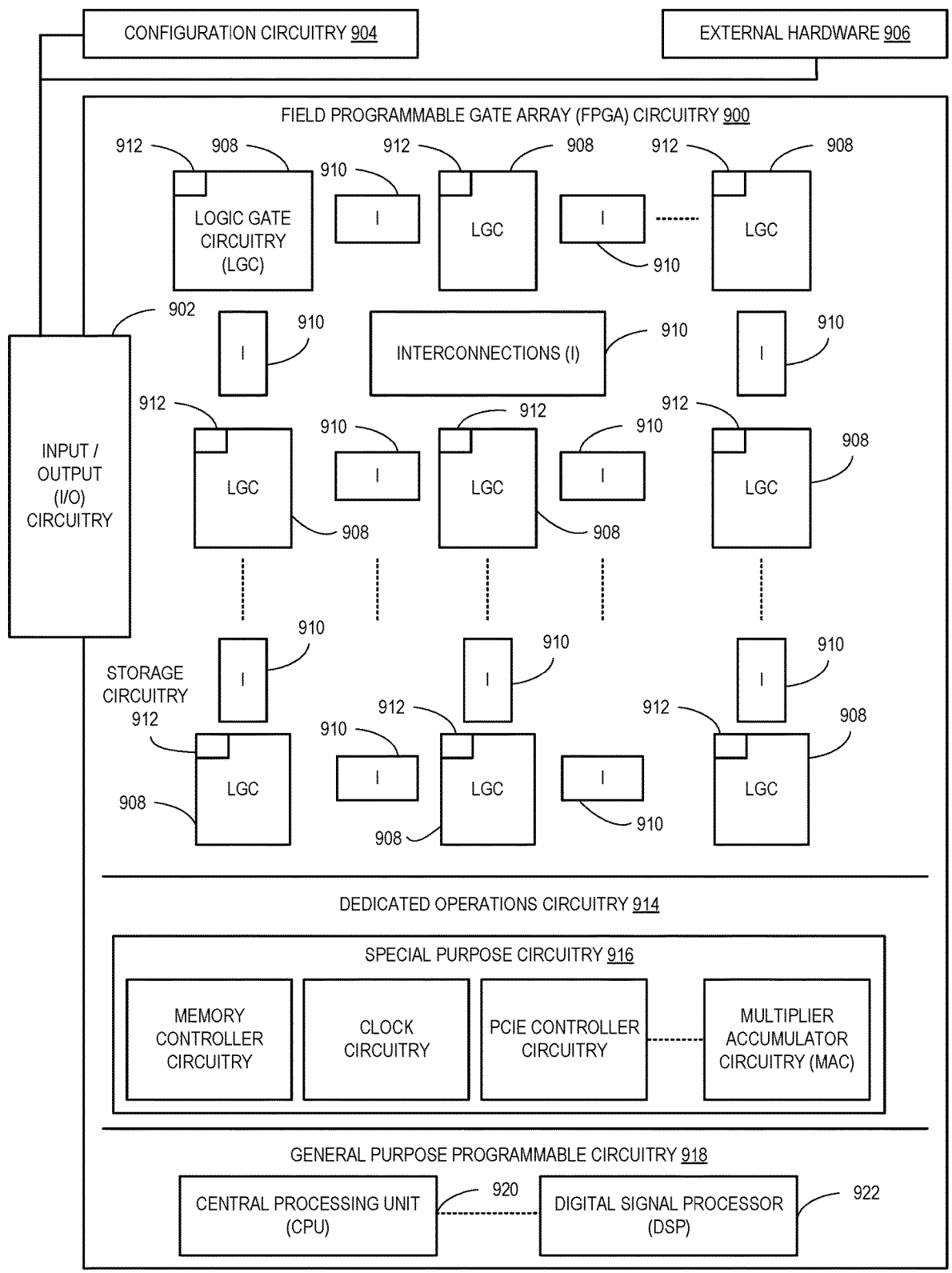
FIG. 9 is a block diagram of another example implementation of the processor circuitry of FIG. 7.

FIG. 9 is a block diagram of another example implementation of the processor circuitry 712 of FIG. 7. In this example, the processor circuitry 712 is implemented by FPGA circuitry 900. The FPGA circuitry 900 can be used, for example, to perform operations that could otherwise be performed by the example microprocessor 800 of FIG. 8 executing corresponding machine readable instructions. However, once configured, the FPGA circuitry 900 instantiates the machine readable instructions in hardware and, thus, can often execute the operations faster than they could be performed by a general purpose microprocessor executing the corresponding software.

More specifically, in contrast to the microprocessor 800 of FIG. 8 described above (which is a general purpose device that may be programmed to execute some or all of the machine readable instructions represented by the flowcharts of FIGS. 5 and/or 6 but whose interconnections and logic circuitry are fixed once fabricated), the FPGA circuitry 900 of the example of FIG. 9 includes interconnections and logic circuitry that may be configured and/or interconnected in different ways after fabrication to instantiate, for example, some or all of the machine readable instructions represented by the flowcharts of FIGS. 5 and/or 6. In particular, the FPGA circuitry 900 may be thought of as an array of logic gates, interconnections, and switches. The switches can be programmed to change how the logic gates are interconnected by the interconnections, effectively forming one or more dedicated logic circuits (unless and until the FPGA circuitry 900 is reprogrammed). The configured logic circuits enable the logic gates to cooperate in different ways to perform different operations on data received by input circuitry. Those operations may correspond to some or all of the software represented by the flowcharts of FIGS. 5 and/or 6. As such, the FPGA circuitry 900 may be structured to effectively instantiate some or all of the machine readable instructions of the flowcharts of FIGS. 5 and/or 6 as dedicated logic circuits to perform the operations corresponding to those software instructions in a dedicated manner analogous to an ASIC. Therefore, the FPGA circuitry 900 may perform the operations corresponding to the some or all of the machine readable instructions of FIGS. 5 and/or 6 faster than the general purpose microprocessor can execute the same.

In the example of FIG. 9, the FPGA circuitry 900 is structured to be programmed (and/or reprogrammed one or more times) by an end user by a hardware description language (HDL) such as Verilog. The FPGA circuitry 900 of FIG. 9, includes example input/output (I/O) circuitry 902 to obtain and/or output data to/from example configuration circuitry 904 and/or external hardware (e.g., external hardware circuitry) 906. For example, the configuration circuitry 904 may implement interface circuitry that may obtain machine readable instructions to configure the FPGA circuitry 900, or portion(s) thereof. In some such examples, the configuration circuitry 904 may obtain the machine readable instructions from a user, a machine (e.g., hardware circuitry (e.g., programmed or dedicated circuitry) that may implement an Artificial Intelligence/Machine Learning (AI/ML) model to generate the instructions), etc. In some examples, the external hardware 906 may implement the microprocessor 800 of FIG. 8. The FPGA circuitry 900 also includes an array of example logic gate circuitry 908, a plurality of example configurable interconnections 910, and example storage circuitry 912. The logic gate circuitry 908 and interconnections 910 are configurable to instantiate one or more operations that may correspond to at least some of the machine readable instructions of FIGS. 5 and/or 6 and/or other desired operations. The logic gate circuitry 908 shown in FIG. 9 is fabricated in groups or blocks. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 908 to enable configuration of the electrical structures and/or the logic gates to form circuits to perform desired operations. The logic gate circuitry 908 may include other electrical structures such as look-up tables (LUTs), registers (e.g., flip-flops or latches), multiplexers, etc.

The interconnections 910 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 908 to program desired logic circuits.

The storage circuitry 912 of the illustrated example is structured to store result(s) of the one or more of the operations performed by corresponding logic gates. The storage circuitry 912 may be implemented by registers or the like. In the illustrated example, the storage circuitry 912 is distributed amongst the logic gate circuitry 908 to facilitate access and increase execution speed.

The example FPGA circuitry 900 of FIG. 9 also includes example Dedicated Operations Circuitry 914. In this example, the Dedicated Operations Circuitry 914 includes special purpose circuitry 916 that may be invoked to implement commonly used functions to avoid the need to program those functions in the field. Examples of such special purpose circuitry 916 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 900 may also include example general purpose programmable circuitry 918 such as an example CPU 920 and/or an example DSP 922. Other general purpose programmable circuitry 918 may additionally or alternatively be present such as a GPU, an XPU, etc., that can be programmed to perform other operations.

Although FIGS. 8 and 9 illustrate two example implementations of the processor circuitry 712 of FIG. 7, many other approaches are contemplated. For example, as mentioned above, modern FPGA circuitry may include an on-board CPU, such as one or more of the example CPU 920 of FIG. 9. Therefore, the processor circuitry 712 of FIG. 7 may additionally be implemented by combining the example microprocessor 800 of FIG. 8 and the example FPGA circuitry 900 of FIG. 9. In some such hybrid examples, a first portion of the machine readable instructions represented by the flowcharts of FIGS. 5 and/or 6 may be executed by one or more of the cores 802 of FIG. 8 and a second portion of the machine readable instructions represented by the flowcharts of FIGS. 5 and/or 6 may be executed by the FPGA circuitry 900 of FIG. 9.

In some examples, the processor circuitry 712 of FIG. 7 may be in one or more packages. For example, the microprocessor 800 of FIG. 8 and/or the FPGA circuitry 900 of FIG. 9 may be in one or more packages. In some examples, an XPU may be implemented by the processor circuitry 712 of FIG. 7, which may be in one or more packages. For example, the XPU may include a CPU in one package, a DSP in another package, a GPU in yet another package, and an FPGA in still yet another package.

Figure 10:
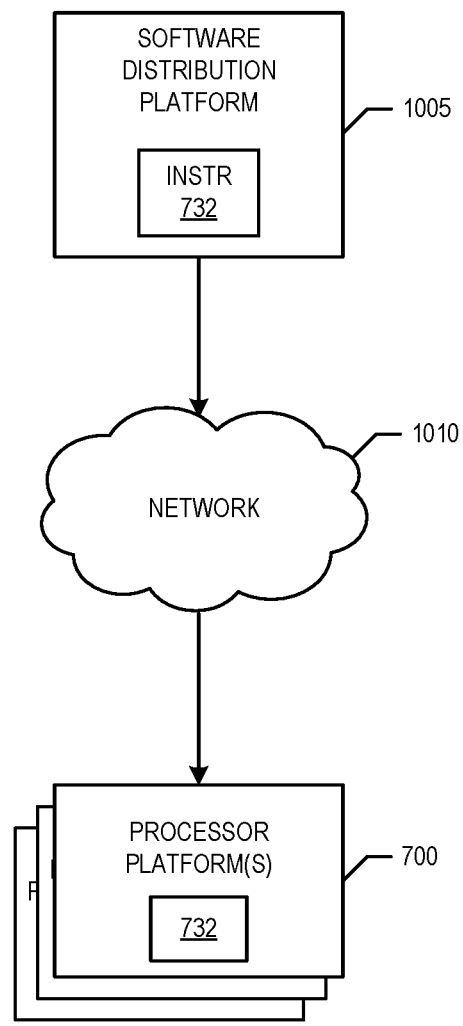
FIG. 10 is a block diagram of an example software distribution platform (e.g., one or more servers) to distribute software (e.g., software corresponding to the example machine readable instructions) to client devices associated with end users and/or consumers (e.g., for license, sale, and/or use), retailers (e.g., for sale, re-sale, license, and/or sub-license), and/or original equipment manufacturers (OEMs) (e.g., for inclusion in products to be distributed to, for example, retailers and/or to other end users such as direct buy customers).

A block diagram illustrating an example software distribution platform 1005 to distribute software such as the example machine readable instructions 732 of FIG. 7 to hardware devices owned and/or operated by third parties is illustrated in FIG. 10. The example software distribution platform 1005 may be implemented by any computer server, data facility, cloud service, etc., capable of storing and transmitting software to other computing devices. The third parties may be customers of the entity owning and/or operating the software distribution platform 1005. For example, the entity that owns and/or operates the software distribution platform 1005 may be a developer, a seller, and/or a licensor of software such as the example machine readable instructions 732 of FIG. 7. The third parties may be consumers, users, retailers, OEMs, etc., who purchase and/or license the software for use and/or re-sale and/or sub-licensing. In the illustrated example, the software distribution platform 1005 includes one or more servers and one or more storage devices. The storage devices store the machine readable instructions 732, which may correspond to the machine readable instructions and/or the operations 500 of FIG. 5 and/or the machine readable instructions and/or the operations 600 of FIG. 6, as described above. The one or more servers of the example software distribution platform 1005 are in communication with a network 1010, which may correspond to any one or more of the Internet and/or any of the example networks described above. In some examples, the one or more servers are responsive to requests to transmit the software to a requesting party as part of a commercial transaction. Payment for the delivery, sale, and/or license of the software may be handled by the one or more servers of the software distribution platform and/or by a third party payment entity. The servers enable purchasers and/or licensors to download the machine readable instructions 732 from the software distribution platform 1005. For example, the software, which may correspond to the machine readable instructions and/or the operations 500 of FIG. 5 and/or the machine readable instructions and/or the operations 600 of FIG. 6, may be downloaded to the example processor platform 700, which is to execute the machine readable instructions 732 to implement the example data matching analyzer 128, the example adjustment factor analyzer 134, and/or the example audience metrics analyzer 154. In some example, one or more servers of the software distribution platform 1005 periodically offer, transmit, and/or force updates to the software (e.g., the example machine readable instructions 732 of FIG. 7) to ensure improvements, patches, updates, etc., are distributed and applied to the software at the end user devices.

From the foregoing, it will be appreciated that example systems, methods, apparatus, and articles of manufacture have been disclosed that determine unique audience size via clustered data. Disclosed methods, apparatus, and articles disclosed herein solve inherent technical problems resulting from the transition from media broadcast over traditional television (cable, satellite, etc.) to media broadcast over the Internet. The disclosed systems, methods, apparatus, and articles of manufacture improve the efficiency of using a computing device by clustering data in computationally efficient clusters. The disclosed systems, methods, apparatus, and articles of manufacture are accordingly directed to one or more improvement(s) in the operation of a machine such as a computer or other electronic and/or mechanical device.

Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

Example methods, apparatus, systems, and articles of manufacture to determine unique audience size via clustered data are disclosed herein. Further examples and combinations thereof include the following:

Example 1 includes an apparatus comprising memory, machine readable instructions, and processor circuitry to at least one of execute or instantiate the machine readable instructions to form a first matrix identifying matching and non-matching instances of first values of respective demographics of an audience of media as reported by a database proprietor and second values of the respective demographics as reported by an audience measurement entity, normalize the first matrix to generate an account sharing adjustment matrix, the account sharing adjustment matrix corresponding to a cluster associated with the media, and apply the account sharing adjustment matrix to a vector of one or more counts of impressions of the media to correct for one or more members of the audience that share a user account registered with the database proprietor, the one or more counts of the impressions corresponding to the respective demographics.

Example 2 includes the apparatus of example 1, wherein respective elements of the account sharing adjustment matrix correspond to a probability that the database proprietor reported a first value for a first one of the demographics if the audience measurement entity reported a second value for the first one of the demographics.

Example 3 includes the apparatus of example 1, wherein the members are first members, the user account is a first user account, and the processor circuitry is to, for the cluster generate a multi-account adjustment vector to adjust the one or more counts to correct for second members of the audience having two or more user accounts registered with the database proprietor, and generate a non-coverage adjustment vector to adjust the one or more counts to correct for third members of the audience that requested the media without being logged into a second user account registered with the database proprietor.

Example 4 includes the apparatus of example 1, wherein the processor circuitry is to cause storage of impression identifiers in a database, the impression identifiers associated with the media, the impression identifiers corresponding to one or more user accounts registered with the database proprietor having respective first personal identifiable information (PII) that matches respective second PII of one or more panelists of the audience measurement entity, and cause storage of the first values of the respective demographics and the second values of the respective demographics, the first values corresponding to the one or more user accounts, the second values corresponding to the one or more panelists.

Example 5 includes the apparatus of example 1, wherein the processor circuitry is to cause storage of impression identifiers in a database, the impression identifiers associated with the media, the impression identifiers corresponding to one or more user accounts of the database proprietor associated with respective first watermark pings that match respective second watermark pings associated with one or more panelists of the audience measurement entity, and cause storage of third values of the respective demographics of the one or more panelists in the database and panel data for the one or more panelists in the database.

Example 6 includes the apparatus of example 5, wherein the members are first members, and the processor circuitry is to for the respective demographics, determine first numbers of viewing events of the media and second numbers of viewers of the media, the first numbers and the second numbers based on the panel data, and based on the first numbers and the second numbers, form a co-viewing adjustment vector to adjust the one or more counts to correct for second members of the audience that were contemporaneously present at respective locations of the viewing events, the co-viewing adjustment vector corresponding to the cluster.

Example 7 includes the apparatus of example 1, wherein the cluster corresponds to a genre of the media, a time of day during which the media was requested, and a type of a device with which the media was requested.

Example 8 includes at least one non-transitory machine readable medium comprising instructions that, when executed, cause at least one logic circuit to form a first matrix identifying matching and non-matching instances of first values of respective demographics of an audience of media as reported by a database proprietor and second values of the respective demographics as reported by an audience measurement entity, normalize the first matrix to generate an account sharing adjustment matrix, the account sharing adjustment matrix corresponding to a cluster associated with the media, and apply the account sharing adjustment matrix to a vector of one or more counts of impressions of the media to correct for one or more members of the audience that share a user account registered with the database proprietor, the one or more counts of the impressions corresponding to the respective demographics.

Example 9 includes the at least one non-transitory machine readable medium of example 8, wherein respective elements of the account sharing adjustment matrix correspond to a probability that the database proprietor reported a first value for a first one of the demographics if the audience measurement entity reported a second value for the first one of the demographics.

Example 10 includes the at least one non-transitory machine readable medium of example 8, wherein the members are first members, the user account is a first user account, and the instructions, when executed, cause the at least one logic circuit to, for the cluster generate a multi-account adjustment vector to adjust the one or more counts to correct for second members of the audience having two or more user accounts registered with the database proprietor, and generate a non-coverage adjustment vector to adjust the one or more counts to correct for third members of the audience that requested the media without being logged into a second user account registered with the database proprietor.

Example 11 includes the at least one non-transitory machine readable medium of example 8, wherein the instructions, when executed, cause the at least one logic circuit to cause storage of impression identifiers in a database, the impression identifiers associated with the media, the impression identifiers corresponding to one or more user accounts registered with the database proprietor having respective first personal identifiable information (PII) that matches respective second PII of one or more panelists of the audience measurement entity, and cause storage of the first values of the respective demographics and the second values of the respective demographics, the first values corresponding to the one or more user accounts, the second values corresponding to the one or more panelists.

Example 12 includes the at least one non-transitory machine readable medium of example 8, wherein the instructions, when executed, cause the at least one logic circuit to cause storage of impression identifiers in a database, the impression identifiers associated with the media, the impression identifiers corresponding to one or more user accounts of the database proprietor associated with respective first watermark pings that match respective second watermark pings associated with one or more panelists of the audience measurement entity, and cause storage of third values of the respective demographics of the one or more panelists in the database and panel data for the one or more panelists in the database.

Example 13 includes the at least one non-transitory machine readable medium of example 12, wherein the members are first members, and the instructions, when executed, cause the at least one logic circuit to for the respective demographics, determine first numbers of viewing events of the media and second numbers of viewers of the media, the first numbers and the second numbers based on the panel data, and based on the first numbers and the second numbers, form a co-viewing adjustment vector to adjust the one or more counts to correct for second members of the audience that were contemporaneously present at respective locations of the viewing events, the co-viewing adjustment vector corresponding to the cluster.

Example 14 includes the at least one non-transitory machine readable medium of example 8, wherein the cluster corresponds to a genre of the media, a time of day during which the media was requested, and a type of a device with which the media was requested.

Example 15 includes a method for determining unique audience size, the method comprising forming a first matrix identifying matching and non-matching instances of first values of respective demographics of an audience of media as reported by a database proprietor and second values of the respective demographics as reported by an audience measurement entity, normalizing the first matrix to generate an account sharing adjustment matrix, the account sharing adjustment matrix corresponding to a cluster associated with the media, and applying the account sharing adjustment matrix to a vector of one or more counts of impressions of the media to correct for one or more members of the audience that share a user account registered with the database proprietor, the one or more counts of the impressions corresponding to the respective demographics.

Example 16 includes the method of example 15, wherein respective elements of the account sharing adjustment matrix correspond to a probability that the database proprietor reported a first value for a first one of the demographics if the audience measurement entity reported a second value for the first one of the demographics.

Example 17 includes the method of example 15, wherein the members are first members, the user account is a first user account, and the method further includes generating a multi-account adjustment vector to adjust the one or more counts to correct for second members of the audience having two or more user accounts registered with the database proprietor, and generating a non-coverage adjustment vector to adjust the one or more counts to correct for third members of the audience that requested the media without being logged into a second user account registered with the database proprietor.

Example 18 includes the method of example 15, further including causing storage of impression identifiers in a database, the impression identifiers associated with the media, the impression identifiers corresponding to one or more user accounts registered with the database proprietor having respective first personal identifiable information (PII) that matches respective second PII of one or more panelists of the audience measurement entity, and causing storage of the first values of the respective demographics and the second values of the respective demographics, the first values corresponding to the one or more user accounts, the second values corresponding to the one or more panelists.

Example 19 includes the method of example 15, further including causing storage of impression identifiers in a database, the impression identifiers associated with the media, the impression identifiers corresponding to one or more user accounts of the database proprietor associated with respective first watermark pings that match respective second watermark pings associated with one or more panelists of the audience measurement entity, and causing storage of third values of the respective demographics of the one or more panelists in the database and panel data for the one or more panelists in the database.

Example 20 includes the method of example 19, wherein the members are first members, and the method further includes for the respective demographics, determining first numbers of viewing events of the media and second numbers of viewers of the media, the first numbers and the second numbers based on the panel data, and based on the first numbers and the second numbers, forming a co-viewing adjustment vector to adjust the one or more counts to correct for second members of the audience that were contemporaneously present at respective locations of the viewing events, the co-viewing adjustment vector corresponding to the cluster.

Example 21 includes the method of example 15, wherein the cluster corresponds to a genre of the media, a time of day during which the media was requested, and a type of a device with which the media was requested.

The following claims are hereby incorporated into this Detailed Description by this reference, with each claim standing on its own as a separate embodiment of the present disclosure.

What is claimed is:

1. An audience measurement computing system comprising:
   a processor;
   memory storing computer-readable instructions that, when executed by the processor, cause the audience measurement computing system to perform operations comprising:
      obtaining impression identifiers corresponding to impressions of media;
      based on two or more of a genre of the media, a time of day during which the media was requested, or a type of a device with which the media was requested, clustering the impression identifiers to generate a plurality of clusters;
      forming a first matrix identifying matching and non-matching instances of first values of respective demographics of an audience of the media as reported by a database proprietor and second values of the respective demographics as reported by an audience measurement entity;
      normalizing the first matrix to generate an account sharing adjustment matrix, the account sharing adjustment matrix corresponding to a cluster of the generated plurality of clusters; and
      applying the account sharing adjustment matrix to a vector of one or more counts of the impressions of the media to correct for one or more members of the audience that share a user account registered with the database proprietor, the one or more counts of the impressions corresponding to the respective demographics.

2. The audience measurement computing system of claim 1, wherein respective elements of the account sharing adjustment matrix correspond to a probability that the database proprietor reported a first value for a first one of the demographics if the audience measurement entity reported a second value for the first one of the demographics.

3. The audience measurement computing system of claim 1, wherein the members are first members, the user account is a first user account, and the operations further comprising:
   for the cluster:
      generating a multi-account adjustment vector to adjust the one or more counts to correct for second members of the audience having two or more user accounts registered with the database proprietor; and
      generating a non-coverage adjustment vector to adjust the one or more counts to correct for third members of the audience that requested the media without being logged into a second user account registered with the database proprietor.

4. The audience measurement computing system of claim 1, the operations further comprising:
   causing storage of the impression identifiers in a database, wherein the impression identifiers correspond to one or more user accounts registered with the database proprietor having respective first personal identifiable information (PII) that matches respective second PII of one or more panelists of the audience measurement entity; and
   causing storage of the first values of the respective demographics and the second values of the respective demographics, the first values corresponding to the one or more user accounts, the second values corresponding to the one or more panelists.

5. The audience measurement computing system of claim 1, the operations further comprising:
   causing storage of the impression identifiers in a database, wherein the impression identifiers correspond to one or more user accounts of the database proprietor associated with respective first watermark pings that match respective second watermark pings associated with one or more panelists of the audience measurement entity; and
   causing storage of third values of the respective demographics of the one or more panelists in the database and panel data for the one or more panelists in the database.

6. The audience measurement computing system of claim 5, wherein the members are first members, and the operations further comprising:
   for the respective demographics, determining first numbers of viewing events of the media and second numbers of viewers of the media, the first numbers and the second numbers based on the panel data; and
   based on the first numbers and the second numbers, forming a co-viewing adjustment vector to adjust the one or more counts to correct for second members of the audience that were contemporaneously present at respective locations of the viewing events, the co-viewing adjustment vector corresponding to the cluster.

7. A non-transitory machine readable medium comprising instructions that, when executed cause a processor to perform operations comprising:
   obtaining impression identifiers corresponding to impressions of media;
   based on two or more of a genre of the media, a time of day during which the media was requested, or a type of a device with which the media was requested, clustering the impression identifiers to generate a plurality of clusters;
   forming a first matrix identifying matching and non-matching instances of first values of respective demographics of an audience of the media as reported by a database proprietor and second values of the respective demographics as reported by an audience measurement entity;
   normalizing the first matrix to generate an account sharing adjustment matrix, the account sharing adjustment matrix corresponding to a cluster of the generated plurality of clusters; and
   applying the account sharing adjustment matrix to a vector of one or more counts of the impressions of the media to correct for one or more members of the audience that share a user account registered with the database proprietor, the one or more counts of the impressions corresponding to the respective demographics.

8. The non-transitory machine readable medium of claim 7, wherein respective elements of the account sharing adjustment matrix correspond to a probability that the database proprietor reported a first value for a first one of the demographics if the audience measurement entity reported a second value for the first one of the demographics.

9. The non-transitory machine readable medium of claim 7, wherein the members are first members, the user account is a first user account, and the operations further comprising:
   for the cluster:
      generating a multi-account adjustment vector to adjust the one or more counts to correct for second members of the audience having two or more user accounts registered with the database proprietor; and
      generating a non-coverage adjustment vector to adjust the one or more counts to correct for third members of the audience that requested the media without being logged into a second user account registered with the database proprietor.

10. The non-transitory machine readable medium of claim 7, the operations further comprising:
   causing storage of the impression identifiers in a database, wherein the impression identifiers correspond to one or more user accounts registered with the database proprietor having respective first personal identifiable information (PII) that matches respective second PII of one or more panelists of the audience measurement entity; and
   causing storage of the first values of the respective demographics and the second values of the respective demographics, the first values corresponding to the one or more user accounts, the second values corresponding to the one or more panelists.

11. The non-transitory machine readable medium of claim 7, the operations further comprising:
   causing storage of the impression identifiers in a database, wherein the impression identifiers correspond to one or more user accounts of the database proprietor associated with respective first watermark pings that match respective second watermark pings associated with one or more panelists of the audience measurement entity; and
   causing storage of third values of the respective demographics of the one or more panelists in the database and panel data for the one or more panelists in the database.

12. The non-transitory machine readable medium of claim 11, wherein the members are first members, and the operations further comprising:
   for the respective demographics, determining first numbers of viewing events of the media and second numbers of viewers of the media, the first numbers and the second numbers based on the panel data; and
   based on the first numbers and the second numbers, forming a co-viewing adjustment vector to adjust the one or more counts to correct for second members of the audience that were contemporaneously present at respective locations of the viewing events, the co-viewing adjustment vector corresponding to the cluster.

13. A method for determining unique audience size, the method performed by an audience measurement computing system comprising a processor and memory, the method comprising
   obtaining impression identifiers corresponding to impressions of media;
   based on two or more of a genre of the media, a time of day during which the media was requested, or a type of a device with which the media was requested, clustering the impression identifiers to generate a plurality of clusters;
   forming a first matrix identifying matching and non-matching instances of first values of respective demographics of an audience of the media as reported by a database proprietor and second values of the respective demographics as reported by an audience measurement entity;
   normalizing the first matrix to generate an account sharing adjustment matrix, the account sharing adjustment matrix corresponding to a cluster of the generated plurality of clusters; and
   applying the account sharing adjustment matrix to a vector of one or more counts of the impressions of the media to correct for one or more members of the audience that share a user account registered with the database proprietor, the one or more counts of the impressions corresponding to the respective demographics.

14. The method of claim 13, wherein respective elements of the account sharing adjustment matrix correspond to a probability that the database proprietor reported a first value for a first one of the demographics if the audience measurement entity reported a second value for the first one of the demographics.

15. The method of claim 13, wherein the members are first members, the user account is a first user account, and the method further comprises:
   for the cluster:
      generating a multi-account adjustment vector to adjust the one or more counts to correct for second members of the audience having two or more user accounts registered with the database proprietor; and
      generating a non-coverage adjustment vector to adjust the one or more counts to correct for third members of the audience that requested the media without being logged into a second user account registered with the database proprietor.

16. The method of claim 13, further comprising:
   causing storage of the impression identifiers in a database, wherein the impression identifiers correspond to one or more user accounts registered with the database proprietor having respective first personal identifiable information (PII) that matches respective second PII of one or more panelists of the audience measurement entity; and
   causing storage of the first values of the respective demographics and the second values of the respective demographics, the first values corresponding to the one or more user accounts, the second values corresponding to the one or more panelists.

17. The method of claim 13, further comprising:
   causing storage of the impression identifiers in a database, wherein the impression identifiers correspond to one or more user accounts of the database proprietor associated with respective first watermark pings that match respective second watermark pings associated with one or more panelists of the audience measurement entity; and
   causing storage of third values of the respective demographics of the one or more panelists in the database and panel data for the one or more panelists in the database.

18. The method of claim 17, wherein the members are first members, and the method further comprises:

for the respective demographics, determining first numbers of viewing events of the media and second numbers of viewers of the media, the first numbers and the second numbers based on the panel data; and based on the first numbers and the second numbers, forming a co-viewing adjustment vector to adjust the one or more counts to correct for second members of the audience that were contemporaneously present at respective locations of the viewing events, the co-viewing adjustment vector corresponding to the cluster.

19. The audience measurement computing system of claim 1, the operations further comprising:
causing storage of the impression identifiers in an audience measurement entity merged database in a privacy-protected cloud environment of the database proprietor.

20. The non-transitory machine readable medium of claim 7, the operations further comprising:
causing storage of the impression identifiers in an audience measurement entity merged database in a privacy-protected cloud environment of the database proprietor.

21. The method of claim 13, further comprising:
causing storage of the impression identifiers in an audience measurement entity merged database in a privacy-protected cloud environment of the database proprietor.

* * * * *